United States Patent
Kasahara et al.

(10) Patent No.: US 7,685,202 B2
(45) Date of Patent: Mar. 23, 2010

(54) EVENT IMPORTANCE ADJUSTMENT METHOD AND DEVICE FOR CARRYING OUT THE METHOD

(75) Inventors: Hiroshi Kasahara, Tokyo (JP); Yoshihisa Terada, Chiba-ken (JP); Toru Nakada, Kanagawa-ken (JP); Norihiko Kobayashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 477 days.

(21) Appl. No.: 11/571,471

(22) PCT Filed: Jun. 29, 2005

(86) PCT No.: PCT/JP2005/011920

§ 371 (c)(1),
(2), (4) Date: Dec. 29, 2006

(87) PCT Pub. No.: WO2006/003918

PCT Pub. Date: Jan. 12, 2006

(65) Prior Publication Data

US 2008/0052315 A1 Feb. 28, 2008

(30) Foreign Application Priority Data

Jun. 30, 2004 (JP) ............................ 2004-193030
Jun. 28, 2005 (JP) ............................ 2005-187958

(51) Int. Cl.
*G06F 17/00* (2006.01)
(52) U.S. Cl. ....................................... 707/758; 707/914
(58) Field of Classification Search ........................ None
See application file for complete search history.

(56) References Cited

U.S. PATENT DOCUMENTS

| 5,717,879 | A | * | 2/1998 | Moran et al. ................. 715/716 |
| 6,148,308 | A | * | 11/2000 | Neubauer et al. ............ 707/203 |
| 6,741,977 | B1 | * | 5/2004 | Nagaya et al. ................. 707/1 |
| 7,035,868 | B2 | * | 4/2006 | Hashimoto et al. .......... 707/102 |
| 2002/0184220 | A1 | * | 12/2002 | Teraguchi et al. ............. 707/10 |
| 2003/0065657 | A1 | * | 4/2003 | Hashimoto et al. ............. 707/3 |
| 2005/0272411 | A1 | * | 12/2005 | Hashimoto et al. ....... 455/414.1 |
| 2006/0010366 | A1 | * | 1/2006 | Hashimoto et al. ....... 715/500.1 |
| 2007/0124679 | A1 | * | 5/2007 | Jeong et al. ................. 715/723 |

OTHER PUBLICATIONS

Hashimoto et al. "Digest Making Method Based on Turning Point Analysis," 2001, Information Systems Engineering International Conference on, vol. 1, pp. 83-91.*
International Search Report for corresponding International PCT Application No. JP2005/011920 dated Nov. 1, 2005.

(Continued)

*Primary Examiner*—John R Cottingham
*Assistant Examiner*—James E Richardson
(74) *Attorney, Agent, or Firm*—RatnerPrestia

(57) ABSTRACT

An event importance adjustment device which extracts events which reflect a course of video contents, and extracts scenes which reflect the course of the video contents. The event importance adjustment device comprises a digest scenario information storing unit that manages a digest scenario information indicative of an extraction condition and an extraction order of an event. The event importance adjustment device further comprises a scenario importance adjusting unit that inputs event information with importance containing the events and situation information to extract an appropriate event.

5 Claims, 36 Drawing Sheets

OTHER PUBLICATIONS

M. Okamoto et al., "Scenario Template ni yoru Sports Digest Jido Seisei Kiko", The Transactions of the Institute of Electronics, Information and Communication Engineers B, vol. J85-B, No. 8, Aug. 1, 2002, pp. 1269-1276.

T. Hashimoto et al., "Turning Point no Kaiseki ni Motozuku Digest Sakusei Hoshiki", The Transactions of the Institute of Electronics, Information and Communication Engineers: Database, vol. 43, No. SIG5 (TOD14), Jun. 15, 2002, pp. 1-11.

W. Miyamori, "Bunmyaku no Nagare to Tokuchoteki na Event ni Motozuku Tekioteki na Eizo Yoyaku Shuho no Kento", FIT2002 Forum on Information Technology Ippan Koen Ronbunshu, vol. 3, Sep. 13, 2002, pp. 139-140.

T. Hashimoto et al., "TV Jushin Tanmatsu ni Okeru Digest Shicho System", Transactions of Information Processing Society of Japan, vol. 41, No. SIG3 (TOD6), May 15, 2000, pp. 71-84.

Y. Kawai et al., "Kojin Tekio o Shiko shita Sports Yoyaku Eizo no Seiseiho", The Institute of Electronics, Information and Communication Engineers Gijutsu Kenkyu Hokoku, vol. 100, No. 566 (PRMU2000-171), Jan. 12, 2001, pp. 83-90.

* cited by examiner

FIG. 2

| ITEM | | CONTENT |
|---|---|---|
| EVENT TITLE | EVENT NAME | NAME OF EVENT |
| | EVENT ATTRIBUTE | PRESENCE OR ABSENCE OF OCCURRENCE OF SCORE BY EVENT |
| | EVENT RESULT | TYPE OF EVENT |
| OCCURRENCE TIME | | TIME WHEN EVENT OCCURS |
| EXECUTOR | | PERSON WHO CARRIES OUT EVENT |
| EXECUTOR TEAM | | TEAM THAT CARRIES OUT EVENT |
| EVENT IMPORTANCE | | NUMERICAL EXPRESSION OF VALUE OF EVENT |

FIG. 3

| ITEM | | | CONTENT |
|---|---|---|---|
| SITUATION INFORMATION | | | |
| | SCORE INFORMATION | | |
| | LOOP | START TIME | TIME AT WHICH FOLLOWING SCORE CONTENT OCCURRED |
| | | END TIME | TIME AT WHICH FOLLOWING SCORE CONTENT ENDED |
| | | HOME TEAM | SCORE OF HOME TEAM |
| | | AWAY TEAM | SCORE OF AWAY TEAM |
| | RUNNER SITUATION | | |
| | LOOP | START TIME | TIME AT WHICH FOLLOWING BASE CONTENT OCCURS |
| | | END TIME | TIME AT WHICH FOLLOWING BASE CONTENT LASTS |
| | | BASE CONTEXT | VALUE INDICATIVE OF CURRENT BASE CONTEXT |

| SCENARIO PATTERN DETERMINATION RULES | | PATTERN No. | EXTRACTION ORDER | EVENT EXTRACTION ADJUSTMENT RULES | | | |
|---|---|---|---|---|---|---|---|
| SCORE | TIE/TURNABOUT/ WINNING | KICK OFF POSITION | | | INTRODUCTION | DEVELOPMENT | TURN | CONCLUSION |
| YES VS YES | WITH TIE/ TURNABOUT/ WINNING | — | 1 | TURN - INTRODUCTION - DEVELOPMENT - CONCLUSION | SPAN: START - TURN TARGET T: KICK-OFF T TARGET E: KICK-OFF E P: +8 | SPAN: INTRODUCTION - TURN TARGET T: (UNDEFINED) TARGET E: E WITH HIGH E IMPORTANCE P: +7 | SPAN: START - PRESENT TARGET T: WINNING/ TIE T TARGET E: LAST TURNABOUT/ TIE/WINNING E P: +10 | SPAN: TURN - PRESENT TARGET T: T OPPOSITE TO TURN TARGET E: E WITH HIGH E IMPORTANCE P: +8 |
| YES VS YES | WITHOUT TIE/ TURNABOUT/ WINNING | — | 2 | INTRODUCTION - TURN - DEVELOPMENT - CONCLUSION | SPAN: START - PRESENT TARGET T: KICK-OFF T TARGET E: KICK-OFF E P: +8 | SPAN: INTRODUCTION - TURN TARGET T: (UNDEFINED) TARGET E: E WITH HIGH E IMPORTANCE P: +6 | SPAN: INTRODUCTION - PRESENT TARGET T: OPPOSING T OF INTRODUCTION TARGET E: LAST HIT POINT E P: +10 | SPAN: START - PRESENT TARGET T: (UNDEFINED) TARGET E: E WITH HIGH E IMPORTANCE P: +7 |
| YES VS NO | | FIRST HALF | 3 | INTRODUCTION - TURN - DEVELOPMENT - CONCLUSION | SPAN: START - PRESENT TARGET T: KICK-OFF T TARGET E: KICK-OFF E P: +8 | SPAN: INTRODUCTION - TURN TARGET T: (UNDEFINED) TARGET E: E WITH HIGH E IMPORTANCE P: +5 | SPAN: INTRODUCTION - PRESENT TARGET T: OPPOSING T OF INTRODUCTION TARGET E: LAST HIT POINT E P: +10 | SPAN: START - PRESENT TARGET T: (UNDEFINED) TARGET E: E WITH HIGH E IMPORTANCE P: +5 |
| YES VS NO | | SECOND HALF | 4 | TURN - DEVELOPMENT - INTRODUCTION - CONCLUSION | SPAN: START - DEVELOPMENT TARGET T: (UNDEFINED) TARGET E: E WITH HIGH E IMPORTANCE P: +6 | SPAN: START - TURN TARGET T: (UNDEFINED) TARGET E: E WITH HIGH E IMPORTANCE P: +5 | SPAN: START - PRESENT TARGET T: KICK-OFF T TARGET E: KICK-OFF E P: +8 | SPAN: TURN - PRESENT TARGET T: T OPPOSITE TO INTRODUCTION TARGET E: E WITH HIGH E IMPORTANCE P: +5 |
| NO VS NO | | — | 5 | TURN - DEVELOPMENT - INTRODUCTION - CONCLUSION | SPAN: START - DEVELOPMENT TARGET T: (UNDEFINED) TARGET E: E WITH HIGH E IMPORTANCE P: +6 | SPAN: START - TURN TARGET T: (UNDEFINED) TARGET E: E WITH HIGH E IMPORTANCE P: +5 | SPAN: START - PRESENT TARGET T: (UNDEFINED) TARGET E: E WITH HIGH E IMPORTANCE P: +7 | SPAN: START - PRESENT TARGET T: (UNDEFINED) TARGET E: E WITH HIGH E IMPORTANCE P: +5 |

\* IN CASE OF A PLURALITY OF TARGETS E BEING PRESENT, LAST E IS PUT TO E TO BE EXTRACTED

[DEFINITION OF TERMS]
SPAN: ABBREVIATION OF "SPAN TO BE SEARCHED"
T: TEAM
E: EVENT
P: EVENT IMPORTANCE ADJUSTMENT POINT
KICK-OFF E: EVENT THAT "EVENT RESULT" OF EVENT INFORMATION IS "KICK-OFF"
TURNABOUT E: EVENT THAT "EVENT RESULT" OF EVENT INFORMATION IS "TURNABOUT"
TIE E: EVENT THAT "EVENT RESULT" OF EVENT INFORMATION IS "TIE"
WINNING E: EVENT THAT "EVENT RESULT" OF EVENT INFORMATION IS "WINNING"
HIT POINT E: EVENT THAT "EVENT ATTRIBUTE" OF EVENT INFORMATION IS "YES"

FIG. 4

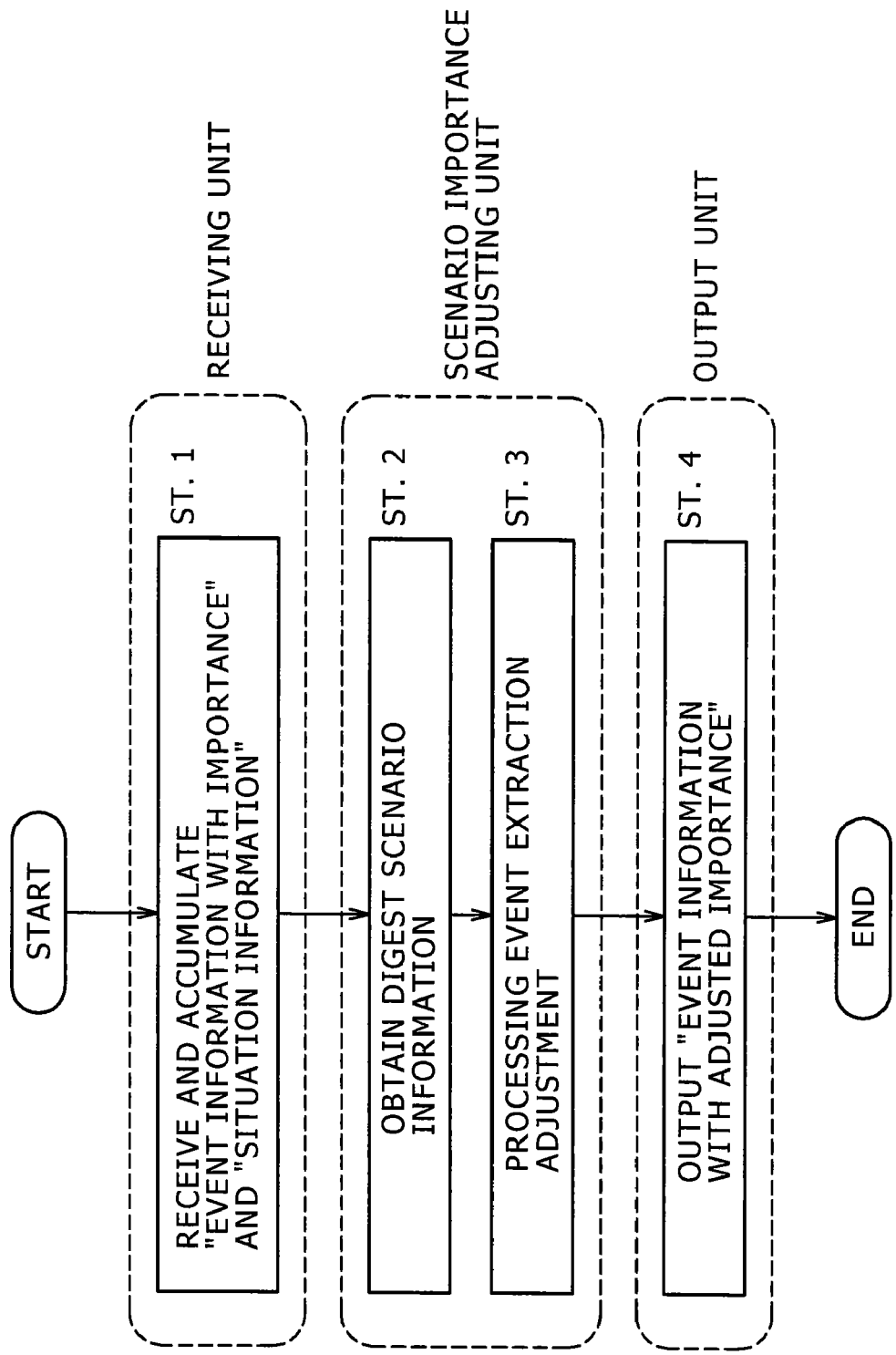

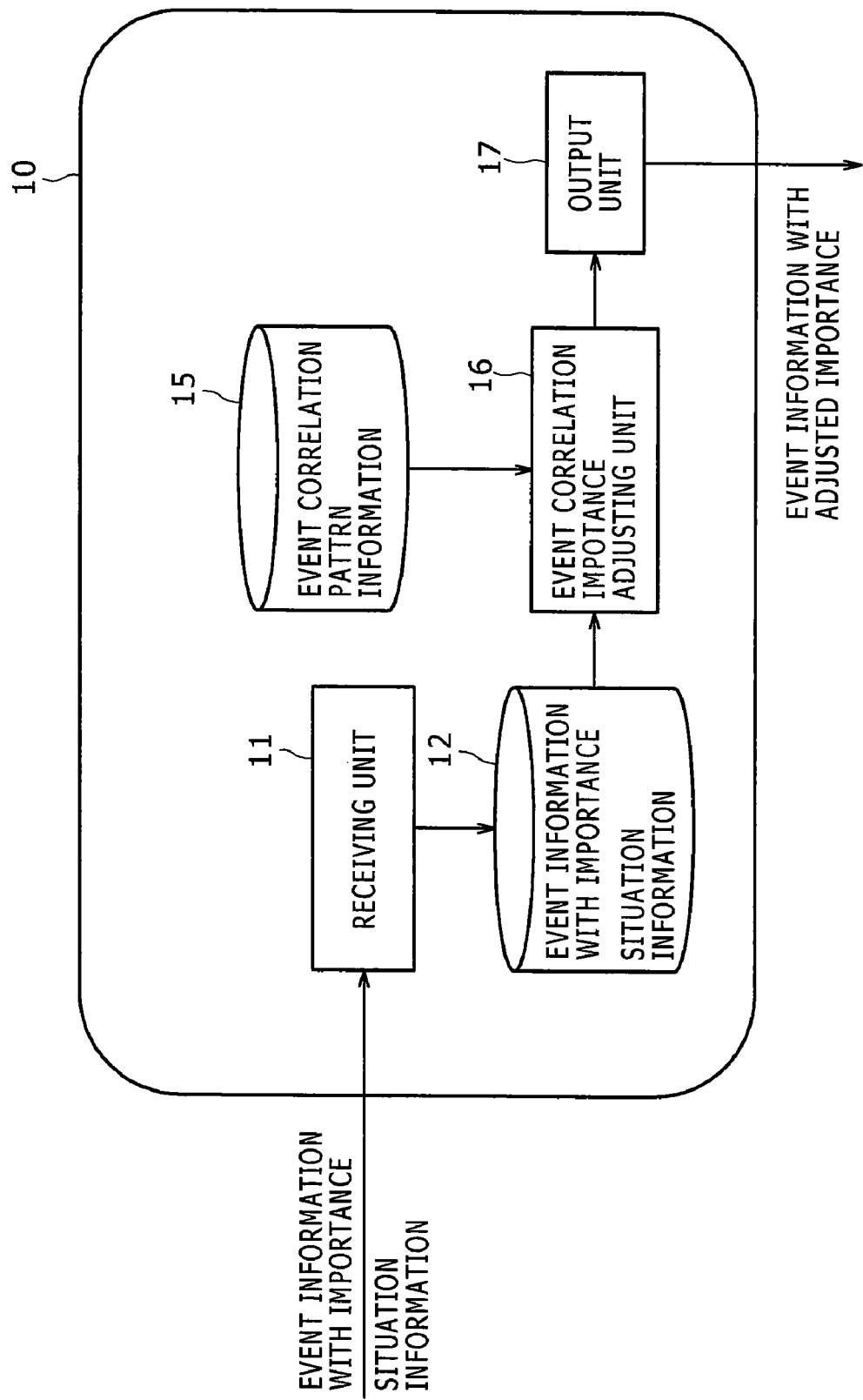

FIG.13

| TRIGGER EVENT NAME | CORRELATION EXTENT | CORRELATION TARGET EVENT | ADJUSTMENT RULES OF CORRELATION EVENT IMPORTANCE |
|---|---|---|---|
| HOME RUN | · START OF INNING - TRIGGER EVENT<br>· SHORTER ONE OF EVENT THAT FIRST RUNNER GET TO BASE AND TRIGGER EVENT | THIRD BASE HIT | ADD +7 TO EVENT IMPORTANCE OF EXTRACTED EVENT |
| | | HIT | ADD +7 TO EVENT IMPORTANCE OF EXTRACTED EVENT |
| | | SACRIFICE BUNT | ADD +7 TO EVENT IMPORTANCE OF EXTRACTED EVENT |
| | | SACRIFICE HIT | ADD +7 TO EVENT IMPORTANCE OF EXTRACTED EVENT |
| | | WALK ON BALLS | ADD +7 TO EVENT IMPORTANCE OF EXTRACTED EVENT |
| | | PITCHED BALL | ADD +7 TO EVENT IMPORTANCE OF EXTRACTED EVENT |
| | | BALK | ADD +5 TO EVENT IMPORTANCE OF EXTRACTED EVENT |
| | | WILD PITCH | ADD +5 TO EVENT IMPORTANCE OF EXTRACTED EVENT |
| | | MISS PITCH | ADD +5 TO EVENT IMPORTANCE OF EXTRACTED EVENT |
| | | BASE STEALING | ADD +5 TO EVENT IMPORTANCE OF EXTRACTED EVENT |
| HIT | · IMMEDIATELY PREVIOUS EVENT | SACRIFICE HIT | ADD +6 TO EVENT IMPORTANCE OF EXTRACTED EVENT |
| | | SACRIFICE BUNT | ADD +3 TO EVENT IMPORTANCE OF EXTRACTED EVENT |

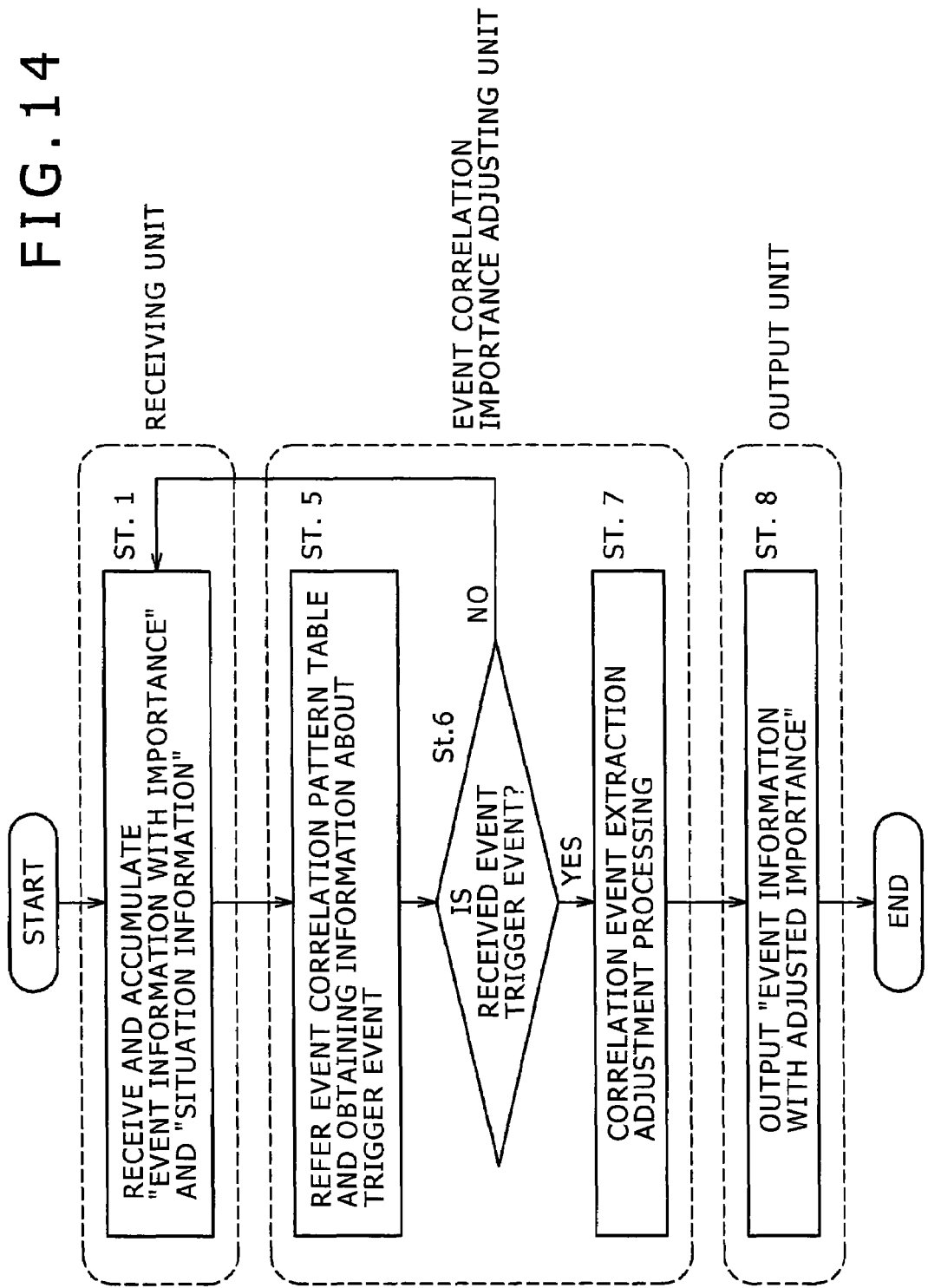

A  3₁ 0  2₃ 0  1₆ 0

B  0  2₂ 1₄ 1₅ 0  0

|  | "INTRODUCTION" | "DEVELOPMENT" |  | "CONCLUSION" |
|--|--|--|--|--|

A  ③₁ 0  ②₃ 0  ①₆ 0

"TURN"

B  0  2₂ 1₄ ①₅ 0  0

: EVENT THAT EXPRESSES COURSE OF WHOLE GAME EVENTS OF "INTRODUCTION", "DEVELOPMENT", "TURN", AND "CONCLUSION"

FIG. 25

| ITEM | | CONTENT |
|---|---|---|
| EVENT IDENTIFIER | | IDENTIFIER THAT DISTINGUISHES EACH EVENT FROM OTHERS |
| EVENT TITLE | EVENT NAME | NAME OF EVENT |
| | EVENT ATTRIBUTE | PRESENCE OR ABSENCE OF OCCURRENCE OF HIT POINT BY EVENT |
| | EVENT RESULT | TYPE OF EVENT |
| OCCURRENCE TIME | | TIME THAT EVENT HAS OCCURRED |
| EXECUTOR | | PERSON WHO CARRIES OUT EVENT |
| EXECUTOR TEAM | | TEAM THAT CARRIES OUT EVENT |
| EVENT IMPORTANCE | | NUMERIC EXPRESSION OF VALUE OF EVENT |

FIG.26

| ITEM | | | CONTENT |
|---|---|---|---|
| SITUATION INFORMATION | | | |
| | SCORE INFORMATION | | |
| | | SCORE INFORMATION IDENTIFIER | IDENTIFIER FOR DISTINGUISHING FOLLOWING SCORE INFORMATION |
| | | START TIME | TIME AT WHICH FOLLOWING SCORE SITUATION HAS OCCURRED |
| | | END TIME | TIME AT WHICH FOLLOWING SCORE SITUATION HAS ENDED |
| | | HOME TEAM | SCORE OF HOME TEAM |
| | | AWAY TEAM | SCORE OF AWAY TEAM |
| | RUNNER SITUATION | | |
| | | RUNNER SITUATION IDENTIFIER | IDENTIFIER FOR DISTINGUISHING FOLLOWING RUNNER CIRCUMSTANCES |
| | | START TIME | TIME AT WHICH FOLLOWING RUNNER SITUATION HAS OCCURRED |
| | | END TIME | TIME AT WHICH FOLLOWING RUNNER SITUATION HAS ENDED |
| | | BASE STATE | VALUE THAT INDICATES STATE OF BASES |

FIG. 27

| SITUATION INFORMATION | SCORE INFORMATION | | | |
|---|---|---|---|---|
| | 001 | | 00:00:00 | |
| | | | 00:14:00 | 0 |
| | 002 | | 00:14:00 | 0 |
| | | | 00:18:00 | 0 |
| | 003 | | 00:18:00 | 1 |
| | | | 00:24:00 | 0 |
| | 004 | | 00:24:00 | 4 |
| | | | 00:26:00 | 0 |
| | 005 | | 00:26:00 | 5 |
| | | | | 00:28:00 |

| | | | | |
|---|---|---|---|---|
| | | | 0 | 00:28:00 |
| | | ... | 6 | ... |
| | 010 | | | 02:04:00 |
| | | | 3 | 02:24:00 |
| | 011 | | 12 | 02:24:00 |
| | | | 3 | 02:26:00 |
| | 012 | | 13 | 02:26:00 |
| | | | 3 | 02:50:00 |
| | | | 14 | |
| RUNNER SITUATION | 001 | | | 00:00:00 |
| | | | | 00:06:00 |

| | | | | |
|---|---|---|---|---|
| | | | | NONE |
| | | ... | ... | ... |
| | | | 004 | 00:12:00 |
| | | | | 00:14:00 |
| | | | | 2ND BASE |
| | | | 005 | 00:14:00 |
| | | | | 00:16:00 |
| | | | | 1ST BASE |
| | | | 006 | 00:16:00 |
| | | | | 00:18:00 |
| | | | | 2ND - 3RD BASES |
| | | ... | ... | ... |
| | | | 008 | 00:22:00 |
| | | | | 00:24:00 |
| | | | | 3RD BASE |
| | | | 009 | 00:24:00 |
| | | | | 00:28:00 |
| | | | | 2ND BASE |

| | | | | |
|---|---|---|---|---|
| | | ... | ... | ... |
| | | | 011 | 00:30:00 |
| | | | | 00:46:00 |
| | | | | NONE |
| | | ... | ... | ... |
| | | | 030 | 02:00:00 |
| | | | | 02:14:00 |
| | | | | NONE |
| | | ... | ... | ... |
| | | | 032 | 02:22:00 |
| | | | | 02:24:00 |
| | | | | 1ST - 3RD BASES |
| | | | 033 | 02:24:00 |
| | | | | 02:26:00 |
| | | | | 2ND - 3RD BASES |
| | | ... | ... | ... |
| | | | 043 | 02:44:00 |
| | | | | 02:50:00 |
| | | | | NONE |

FIG.28

SCENARIO PATTERN DETERMINATION TABLE

| PATTERN No. | HIT POINT | | DIFFERENCE OF SCORES | CHANGE OF SCORE TRANSITION | NUMBER OF TURNABOUT | NUMBER OF EVEN SCORE |
|---|---|---|---|---|---|---|
| 1 | WINNING TEAM: "MIDDLE" OR MORE | LOSING TEAM: "SMALL" | "LARGE" | "MIDDLE" OR MORE PRIOR TO MIDDLE INNINGS UNDEFINED | ZERO AFTER MIDDLE INNINGS | ZERO AFTER MIDDLE INNINGS |
| 2 | WINNING TEAM: UNDEFINED | LOSING TEAM: UNDEFINED | "MIDDLE" OR MORE | UNDEFINED | UNDEFINED | UNDEFINED |
| 3 | WINNING TEAM: UNDEFINED | LOSING TEAM: "SMALL" | "MIDDLE" OR LESS (WITHOUT "ZERO") | TRANSITION TOWARD EVEN OR MORE POINT DIFFERENCE AFTER MIDDLE INNINGS | ZERO AFTER MIDDLE INNINGS | ZERO AFTER MIDDLE INNINGS |
| 4 | WINNING TEAM: UNDEFINED | LOSING TEAM: UNDEFINED | "SMALL" (WITHOUT "ZERO") | TRANSITION TOWARD LESS POINT DIFFERENCE IN FINAL INNINGS | ZERO | UNDEFINED |
| 5 | WINNING TEAM: UNDEFINED | LOSING TEAM: UNDEFINED | "SMALL" | UNDEFINED | UNDEFINED | UNDEFINED |
| 6 | WINNING TEAM: UNDEFINED | LOSING TEAM: UNDEFINED | "SMALL" | TRANSITION TOWARD LESS POINT DIFFERENCE IN FINAL INNINGS | ONLY ONCE AT FINAL INNINGS (MAY BE ZERO IF TIE EVEN SCORE) | UNDEFINED |
| 7 | BOTH TEAM: "0" | | "ZERO" | ALL "ZERO" | ZERO | ZERO |

* "SMALL": 0 - 3, "MIDDLE": 4 - 6, "LARGE": 7 -
* EARLY INNINGS: 1 - 3, MIDDLE INNINGS: 4 - 6, FINAL INNINGS: 7 -

FIG.29

EXAMPLE: IN CASE OF PATTERN NO. = 1

EVENT EXTRACTION ADJUSTMENT TABLE

| SCENE NO. | EXTRACTION ORDER | TARGET TEAM | TARGET EVENT | SPAN TO BE SEARCHED | EVENT IMPORTANCE ADJUSTMENT POINT |
|---|---|---|---|---|---|
| 1 | 1 | WINNING TEAM | SCORE EVENT (WINNING POINT) | FROM START OF GAME TO PRESENT | +1000 |
| 2 | 3 | WINNING TEAM | SCORE EVENT (ADDITIONAL POINT) | FORWARD AFTER SCENE NUMBER 1 | +3000 |
| 3 | 4 | LOSING TEAM | EASY FLY OR STRUCK OUT | FORWARD BEFORE SCENE NUMBER 1 | +2000 |
| 4 | 2 | WINNING TEAM | SCORE EVENT (INSURANCE RUN) | BACKWARD AFTER SCENE NUMBER 1 | +1000 |
| 5 | 5 | LOSING TEAM | EASY FLY OR STRUCK OUT | BACKWARD AFTER SCENE NUMBER 4 | +1000 |

FIG. 32

EVENT CORRELATION PATTERN TABLE

| PATTERN NO. | SCENE NO. | TARGET TEAM | TARGET EVENT | CORRELATION EXTENT | ADJUSTMENT POINT OF CORRELATION EVENT IMPORTANCE |
|---|---|---|---|---|---|
| 1 | 1 | WINNING TEAM | HIT \| ON-BASE | BACKWARD BEFORE SCENARIO EVENT, IN EXTENT THAT DOES NOT EXCEED ANOTHER SCENARIO EVENT | +400 |
| | 1 | WINNING TEAM | ON-BASE / HOME-IN | SECOND FROM LAST BEFORE SCENARIO EVENT, IN EXTENT THAT DOES NOT EXCEED ANOTHER SCENARIO EVENT | +100 |
| | 2 | WINNING TEAM | SCORING POINT | FORWARD AFTER SCENARIO EVENT, IN EXTENT THAT DOES NOT EXCEED ANOTHER SCENARIO EVENT | +600 |
| | 2 | WINNING TEAM | SCORING POINT | SECOND FROM TOP AFTER SCENARIO EVENT, IN EXTENT THAT DOES NOT EXCEED ANOTHER SCENARIO EVENT | +300 |
| | 3 | LOSING TEAM | STRUCK OUT \| MULTIPLE OUT | FORWARD AFTER SCENARIO EVENT, IN EXTENT THAT DOES NOT EXCEED ANOTHER SCENARIO EVENT | +500 |
| | 3 | LOSING TEAM | STRUCK OUT \| MULTIPLE OUT | SECOND FROM TOP AFTER SCENARIO EVENT, IN EXTENT THAT DOES NOT EXCEED ANOTHER SCENARIO EVENT | +200 |
| | 4 | WINNING TEAM | SCORING POINT | BACKWARD BEFORE SCENARIO EVENT, IN EXTENT THAT DOES NOT EXCEED ANOTHER SCENARIO EVENT | +400 |
| | 4 | WINNING TEAM | SCORING POINT | SECOND FROM LAST BEFORE SCENARIO EVENT, IN EXTENT THAT DOES NOT EXCEED ANOTHER SCENARIO EVENT | +100 |

FIG. 34

| EVENT IDENTIFIER | 001 | ... | 007 | 008 | 009 | ... | 012 | 013 | 014 | ... |
|---|---|---|---|---|---|---|---|---|---|---|
| EVENT NAME | STRUCK OUT | ... | HIT | 2ND BASE HIT | HOME RUN | ... | 2ND BASE HIT | 2ND BASE HIT | 2ND BASE HIT | ... |
| EVENT ATTRIBUTE | NO | ... | YES | NO | YES | ... | YES | YES | YES | ... |
| EVENT RESULT | BAT | ... | KICKOFF | BAT | SCORING | ... | SCORING | SCORING | SCORING | ... |
| OCCURRENCE TIME | 00:02:00 | ... | 00:14:00 | 00:16:00 | 00:18:00 | ... | 00:24:00 | 00:26:00 | 00:28:00 | ... |
| EXECUTOR | A1 | ... | B4 | B5 | B6 | ... | B9 | B1 | B2 | ... |
| EXECUTOR TEAM | A | ... | B | B | B | ... | B | B | B | ... |
| EVENT IMPORTANCE | 11 | ... | 19 | 14 | 24 | ... | 18 | 15 | 15 | ... |

| 017 | 018 | ... | 022 | ... | 062 | ... | 072 | 073 | ... | 085 |
|---|---|---|---|---|---|---|---|---|---|---|
| STRUCK OUT | STRUCK OUT | ... | STRUCK OUT | ... | HOME RUN | ... | HIT | HIT | ... | 3RD BASE GROUNDER |
| NO | NO | ... | NO | ... | YES | ... | YES | YES | ... | NO |
| BAT | BAT | ... | BAT | ... | SCORING | ... | SCORING | SCORING | ... | BAT |
| 00:34:00 | 00:36:00 | ... | 00:44:00 | ... | 02:04:00 | ... | 02:24:00 | 02:26:00 | ... | 02:50:00 |
| A5 | A6 | ... | A7 | ... | B9 | ... | B7 | B8 | ... | A2 |
| A | A | ... | A | ... | B | ... | B | B | ... | A |
| 10 | 10 | ... | 10 | ... | 14 | ... | 19 | 20 | ... | 12 |

FIG. 35

| EVENT IDENTIFIER | 001 | ... | 007 | 008 | ... | 009 | ... | 012 | 013 | 014 |
|---|---|---|---|---|---|---|---|---|---|---|
| EVENT NAME | STRUCK OUT | ... | HIT | 2ND BASE HIT | ... | HOME RUN | ... | 2ND BASE HIT | 2ND BASE HIT | HIT |
| EVENT ATTRIBUTE | NO | ... | YES | NO | ... | YES | ... | YES | YES | YES |
| EVENT RESULT | BAT | ... | KICKOFF | BAT | ... | SCORING | ... | SCORING | SCORING | SCORING |
| OCCURRENCE TIME | 00:02:00 | ... | 00:14:00 | 00:16:00 | ... | 00:18:00 | ... | 00:24:00 | 00:26:00 | 00:28:00 |
| EXECUTOR | A1 | ... | B4 | B5 | ... | B6 | ... | B9 | B1 | B2 |
| EXECUTOR TEAM | A | ... | B | B | ... | B | ... | B | B | B |
| EVENT IMPORTANCE | 11 | ... | 19 | 14 | ... | 1024 | ... | 3018 | 15 | 15 |
| SCENE NUMBER | | | | | | 1 | | 2 | | |

| 017 | 018 | ... | 022 | ... | 062 | ... | 072 | 073 | ... | 085 |
|---|---|---|---|---|---|---|---|---|---|---|
| STRUCK OUT | STRUCK OUT | ... | STRUCK OUT | ... | HOME RUN | ... | HIT | HIT | ... | 3RD BASE GROUNDER |
| NO | NO | ... | NO | ... | YES | ... | YES | YES | ... | NO |
| BAT | BAT | ... | BAT | ... | SCORING | ... | SCORING | SCORING | ... | BAT |
| 00:34:00 | 00:36:00 | ... | 00:44:00 | ... | 02:04:00 | ... | 02:24:00 | 02:26:00 | ... | 02:50:00 |
| A5 | A6 | ... | A7 | ... | B9 | ... | B7 | B8 | ... | A2 |
| A | A | ... | A | ... | B | ... | B | B | ... | A |
| 2010 | 10 | ... | 10 | ... | 14 | ... | 19 | 1020 | ... | 1012 |
| 3 | | | | | | | | 4 | | 5 |

FIG. 36

| EVENT IDENTIFIER | 001 | ... | 007 | 008 | 009 | ... | 012 | 013 | 014 |
|---|---|---|---|---|---|---|---|---|---|
| EVENT NAME | STRUCK OUT | ... | HIT | 2ND BASE HIT | HOME RUN | ... | 2ND BASE HIT | 2ND BASE HIT | HIT |
| EVENT ATTRIBUTE | NO | ... | YES | NO | YES | ... | YES | YES | YES |
| EVENT RESULT | BAT | ... | KICKOFF | BAT | SCORING | ... | SCORING | SCORING | SCORING |
| OCCURRENCE TIME | 00:02:00 | ... | 00:14:00 | 00:16:00 | 00:18:00 | ... | 00:24:00 | 00:26:00 | 00:28:00 |
| EXECUTOR | A1 | ... | B4 | B5 | B6 | ... | B9 | B1 | B2 |
| EXECUTOR TEAM | A | ... | B | B | B | ... | B | B | B |
| EVENT IMPORTANCE | 11 | ... | 119 | 414 | 1024 | ... | 3018 | 615 | 315 |
| SCENE NUMBER |  | ... | 1 | 1 | 1 | ... | 2 | 2 | 2 |

| 017 | 018 | ... | 022 | ... | 062 | ... | 072 | 073 | ... | 085 |
|---|---|---|---|---|---|---|---|---|---|---|
| STRUCK OUT | STRUCK OUT | ... | STRUCK OUT | ... | HOME RUN | ... | HIT | HIT | ... | 3RD BASE GROUNDER |
| NO | NO | ... | NO | ... | YES | ... | YES | YES | ... | NO |
| BAT | BAT | ... | BAT | ... | SCORING | ... | SCORING | SCORING | ... | BAT |
| 00:34:00 | 00:36:00 | ... | 00:44:00 | ... | 02:04:00 | ... | 02:24:00 | 02:26:00 | ... | 02:50:00 |
| A5 | A6 | ... | A7 | ... | B9 | ... | B7 | B8 | ... | A2 |
| A | A | ... | A | ... | B | ... | B | B | ... | A |
| 2010 | 10 | ... | 10 | ... | 14 | ... | 19 | 1020 | ... | 1012 |
| 3 | 3 | ... | 3 | ... | 4 | ... | 4 | 4 | ... | 5 |

EVENT IMPORTANCE ADJUSTMENT METHOD AND DEVICE FOR CARRYING OUT THE METHOD

This Application is a U.S. National Phase Application of PCT International Application No. PCT/JP2005/011920 Filed Jun. 29, 2005.

FIELD OF THE INVENTION

The present invention is related to a method for adjusting the importance when an event with the importance is extracted from within a video contents to create a digest and a device and a program for carrying out the method, in particular the present invention is related to the method for adjusting the importance so as to allow extracting an event which reflects the course of the video contents.

BACKGROUND OF THE INVENTION

In the broadcasting stations, a digest is created from the video of a live telecast of sports scene so as to allow replaying in the course of live telecast as "highlight scene so far", or introducing the summary of the game in a sports news program of the day. The game of sports is a drama without scenario, and no one can forecast when and where an important scene arrives. For editing manually the digest, the selection of important scenes may be time-consuming and labor-intensive. Although there has been proposed an attempt to automatically extract the important scenes based on the change of the amount of video characteristics or the loudness of the cheer of supporters, any important events which may characterize the course of the game may not be positively extracted in such a method.

In the following Patent Reference 1 a digest creating apparatus for digitizing every event and situation in a baseball game based on the predetermined contents to analyze the transition of the value to select some events to be extracted. The apparatus has the video input with indexes added by the index producer. An index can be set specifically for a variety of events including the start of the game, the start of batting, a pitch, a strike, a free pass ball, a 1st base hit, a 2nd base hit, and so on.

The digest creating apparatus maintains a table containing the numerical information for each index, weight information set to add to the numerical information, and it creates the numerical video information in which the contents of the video information is presented as the change course of the digitized values. Then the apparatus extracts an event situated at the peak of the change course of the numerical values to create the digest. When the index information is multiplexed with the sports video information and is broadcasted in a digital broadcast, a receiver, which has a digest creating device, can accumulate the streaming of the live sports telecast video, and then create a digest to be displayed.

Patent Reference #1: JP-A-2000-261754

SUMMARY OF THE INVENTION

However, in accordance with the method disclosed in Patent Reference 1, the event importance is calculated based only on the event and the situation at that time. There is a problem that it cannot weigh the importance in view of the course of the game. When an event is extracted by use of the importance calculated based only on the event and the situation at that time without taking into account the "course of the game", for example, if a series of events with a high importance succeeds in a period of time, only "events intensively occurred within a short period of time" are extracted; if there are repeated scoring events such as "turnabouts" in a game, only "events with similar contents" are extracted, so that the contents are locally, somewhat biased, or a digest is created with the similar contents.

In addition, in accordance with the method disclosed in Patent Reference 1, which does not take into account the relationship between events, there is another problem that the value of a preceding event cannot be re-evaluated with the succeeding event. For example, a hit or a walk on balls, occurred immediately prior to a home run, which may contribute to the increase of scoring points at the time of home run, should be evaluated higher than a regular hit or walk on balls. However, the method disclosed in Patent Reference 1 cannot re-evaluate such events.

The present invention has been made in view of such circumstances to over come the problems of the prior art and has an object to provide an event importance adjustment method for allowing extracting an event which reflects the course of a video contents, or extracting events having a relationship therebetween to allow extracting scenes which reflects the course of the video contents, and to provide a device and a program for carrying out the method.

The event importance adjustment device in accordance with the present invention includes a digest scenario information storing unit that manages digest scenario information indicative of an event extraction condition, and extraction order and an event importance adjustment point specific to presentation of a course of video contents, and a scenario importance adjusting unit that inputs the event information with importance containing events each indicative of a phenomenon in the video contents and the importance of the event as well as situation information indicative of a situation of the video contents, extracts an appropriate event based on the digest scenario information, and adjusts the importance of the event.

The device allows avoiding the tight formation of events adopted in the digest in the time course, and the duplication of the content, to allow automated production of a digest which reflects the course of the video contents.

The event importance adjustment device in accordance with the present invention also includes, in addition to the digest scenario information storing unit and the scenario importance adjusting unit mentioned above, an event correlation pattern information storing unit that manages an event correlation pattern table indicative of a trigger event which triggers start of processing, a correlation event which is associated with the trigger event, and an importance adjustment point of the above correlation events, and an event correlation importance adjusting unit that extracts an appropriate correlation event based on the event correlation pattern table if the event adjusted by the scenario importance adjusting unit is the trigger event, and adjusts the importance of the above correlation event.

With these units the "event group", which has some relationship with the events characteristic to the expression of the course of video contents, is likely to be adopted in the digest, therefore enabling the automated production of a digest which reflects the course of video contents.

The event importance adjustment device in accordance with the present invention may also be equipped only with the event relation information storing unit and the event correlation importance adjusting unit cited above without the digest scenario information storing unit and the scenario importance adjusting unit mentioned above so as to only adjust the importance of the correlation events.

With this device the "event group", which has some relationship with the important event of video contents, is likely to be adopted in the digest.

In the event importance adjustment method and the event importance adjustment device for carrying out the method in accordance with the present invention, the importance of any events important to the video contents may be adjusted so as to be able to avoiding the tight formation of events adopted in the digest in the time course, and the duplication of the content, also the importance of events may be adjusted so as to take into account the relationship between events to be able to adopt a bunch of relative events in a digest. Therefore the events may be extracted so as to reflect the course of video contents to allow the automated production of an appropriate digest.

BREIF DESCRIPTION OF THE DRAWINGS

FIG. 2 shows a schematic diagram of data of event information with importance to be inputted into the event importance adjustment device in accordance with the first embodiment of the present invention;

FIG. 3 shows a schematic diagram of data of situation information to be inputted into the event importance adjustment device in accordance with the first embodiment of the present invention;

FIG. 4 shows a schematic diagram indicative of the data structure of digest scenario information in accordance with the first embodiment of the present invention;

FIG. 5 shows a schematic flow diagram indicative of the processing procedure of the event importance adjustment device in accordance with the first embodiment of the present invention;

FIG. 12 shows a schematic block diagram indicative of the arrangement of an event importance adjustment device in accordance with a second embodiment of the present invention;

FIG. 13 shows a schematic diagram indicative of the data structure of event correlation pattern information in accordance with the second embodiment of the present invention;

FIG. 14 shows a schematic flow diagram indicative of the processing procedure in the event importance adjustment device in accordance with the second embodiment of the present invention;

FIG. 25 shows a schematic diagram indicative of the data structure of the event information with importance to be inputted into the event importance adjustment device in accordance with the fourth embodiment of the present invention;

FIG. 26 shows a schematic diagram indicative of the data structure of the situation information to be inputted into the event importance adjustment device in accordance with the fourth embodiment of the present invention;

FIG. 27 shows a schematic diagram indicative of the data structure with the identifier added for the situation information in accordance with the fourth embodiment of the present invention;

FIG. 28 shows a schematic diagram indicative of the data structure in a scenario pattern determination table of digest scenario information in accordance with the fourth embodiment of the present invention;

FIG. 29 shows a schematic diagram indicative of the data structure in the event extraction adjustment table of the digest scenario information in accordance with the fourth embodiment of the present invention;

FIG. 32 shows a schematic diagram indicative of the data structure of event correlation pattern information in accordance with the fourth embodiment of the present invention;

FIG. 34 shows a schematic diagram indicative of the data structure of the event information with importance (input data) to be inputted into the scenario importance adjusting unit in accordance with the fourth embodiment of the present invention;

FIG. 35 shows a schematic diagram indicative of the data structure of the event information with importance (intermediate data) to be outputted from the scenario importance adjusting unit in accordance with the fourth embodiment of the present invention;

Figure 37:
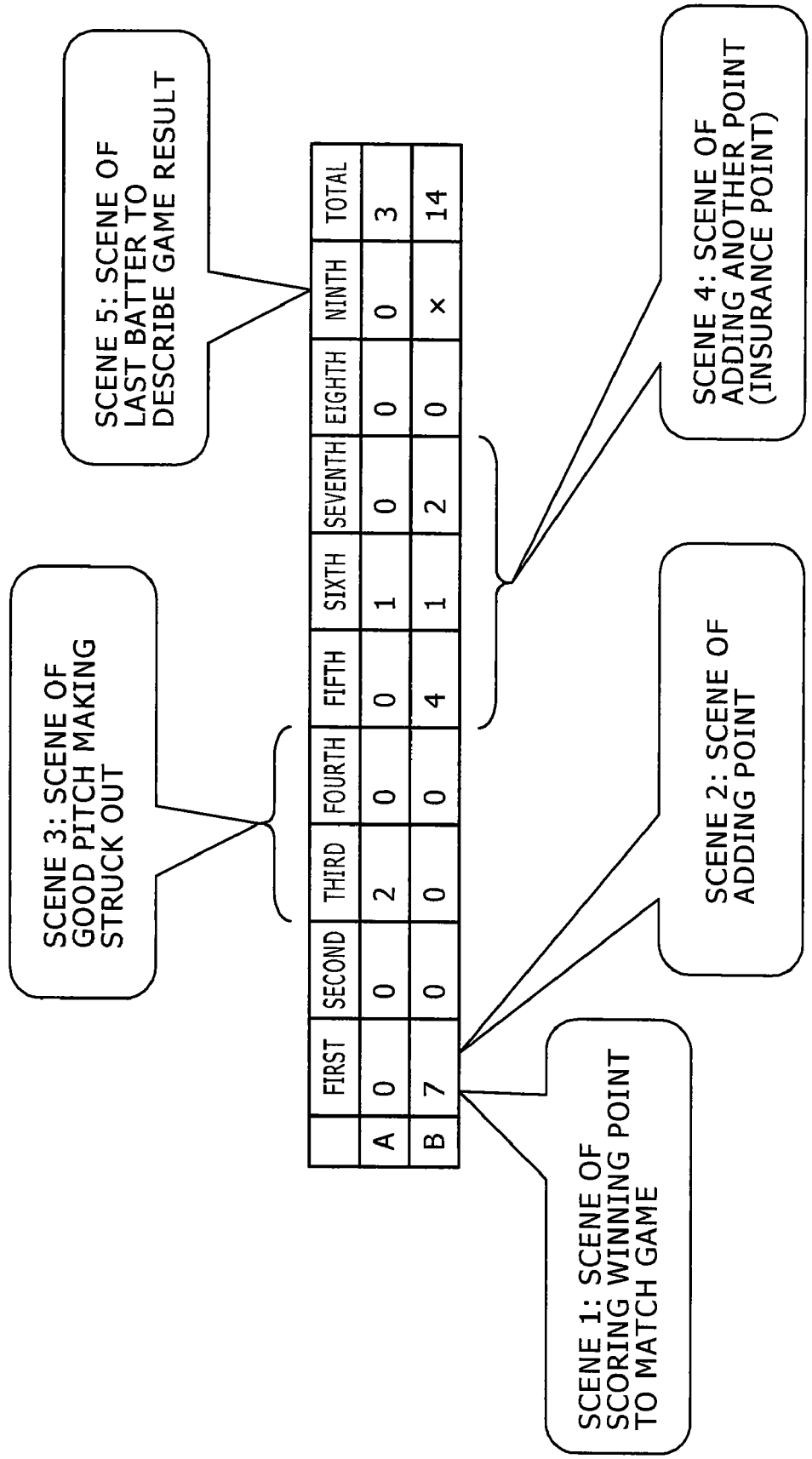

FIG. 36 shows a schematic diagram indicative of the data structure of the event information with importance (output data) to be outputted from the event correlation importance adjusting unit in accordance with the fourth embodiment of the present invention; and FIG. 37 shows a schematic diagram illustrating various scenes extracted by the event extraction adjustment process and the relational event extraction adjustment process in accordance with the fourth embodiment of the present invention.

DETAILED DESCRIPTION OF THE EMBODIMENTS

Now some embodiments in accordance with the present invention will be described in greater details herein below. In the embodiments, a baseball game is cited as the typical source of video contents used, however any video contents of other sports may also be used, and the present invention applies to any type of video contents of other genres.

First Embodiment

Figure 1:
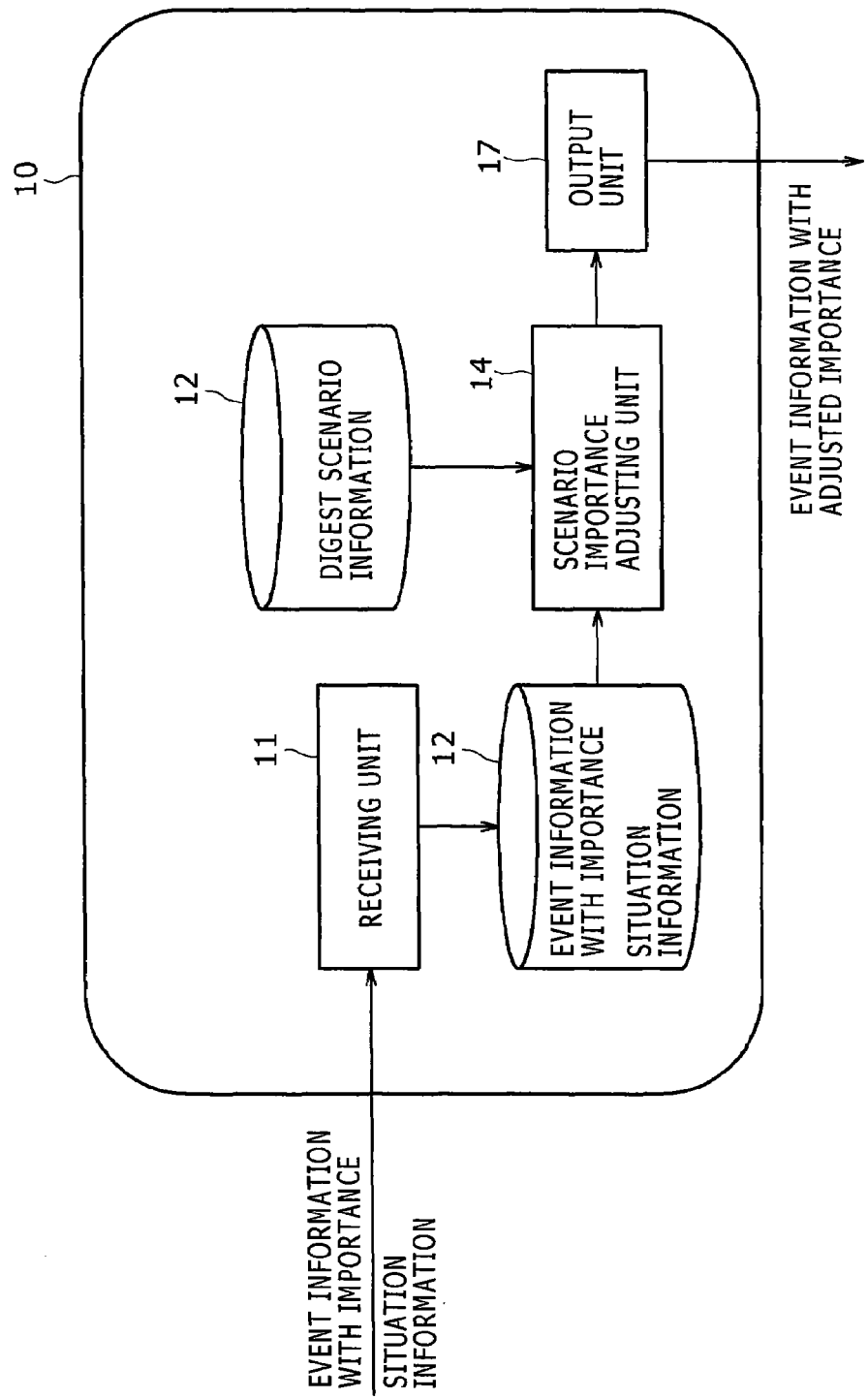
FIG. 1 shows a schematic block diagram indicative of the arrangement of an event importance adjustment device in accordance with a first embodiment of the present invention.

The event importance adjustment method in accordance with the first embodiment of the present invention is characterized in that it extracts such events as "introduction", "development", "turn", and "conclusion" in correspondence with the pattern of a predetermined game based on the "presence or absence of score of the both teams" and "the transition thereof", by considering the game course of the video contents as a scenario having elements of introduction", "development", "turn", and "conclusion" to increase the importance of each of events corresponding thereto. Now referring to FIG. 1, there is shown a schematic diagram of an event importance adjustment device 10 for carrying out the method. The device 10 includes a receiving unit 11 for receiving the event information with importance that is the event information indicative of the contents of an event with the importance added, and the situation information indicative of the circumstances such as the score and runners, an accumulator unit 12 for accumulating the received event information with importance and situation information, a storing unit 13 for storing the digest scenario information to determine an event corresponding to any one of introduction", "development", "turn", and "conclusion", and to set the amount of increase of the appropriate event importance, a scenario importance adjusting unit 14 for adjusting the importance of the event information with importance based on the digest scenario information, and an output unit 17 for outputting the event information with importance having the importance adjusted. The destination of output includes, but is not limited to, a monitor, a storage device, a printer, and so on.

The scenario importance adjusting unit 14 may be achieved by performing a program for defining the behavior by a computer equipped in the event importance adjustment device 10.

The event information and situation information can be created by the information producer seeing the telecast of the baseball game, or alternatively can be created automatically from the telecast source of the game. The event information is added with the importance by the digest generating device described in Patent Reference 1, then the event information with importance and the situation information are input to the receiving unit 11 of the event importance adjustment device 10. The event information with importance includes, such information as shown in FIG. 2, as "event title", "occurred time" of the event, "executor" of the event, "executor team" indicating the acting team of the event, and the "event importance" which is the digitized event value. The event title may be consisted of the "name of event", the "event attribute" showing the presence or absence of the occurrence of score by the event, and the "event result" indicating the type of event classified by the result of the event.

The name of event may be one of such name of event as the "hit", "2nd base hit", "home run", "sacrificed fly", "infield grounder", "wild pitch", "pitched ball", "successful pick-off throw", "successful base steal" "strike", "ball", "walk on balls", "change of pitcher", "scuffle", and so on. The event result indicates "kickoff" for the first event of the executor team with the event attribute of "yes", or "turnabout" for the event that turns the tables with the event attribute of "yes", "tie" for the event when scoring the tying run with the event attribute of "yes", "winning" for the event when the score comes to "winner" from "tie" with the event attribute of "yes", "score" for any other events with the event attribute of "yes", and "come to bat" for any other events.

The situation information includes, as shown in FIG. 3, the information on the scoring and the runners, the scoring information includes the score of "home team", the score of "away team", the "start time" indicating the time from which the scoring situation occurs, and the "end time" indicating the time on which the scoring situation terminates. The runner situation includes a value indicative of "on-base" condition, the "start time" indicative of the time from which the on-base condition occurs, and the "end time" indicative of the time on which the on-base condition terminates.

The digest scenario information includes, as shown in FIG. 4, five scenario patterns being set in accordance with the scoring situation (both teams have scores, one has but the other has not, and neither team has any score), the presence or absence of "same score/turnabout/winning" (here the slash indicates "and/or") when both teams have scores (with the same score/turnabout/winning, and without the same score/ turnabout/winning) the position of kickoff (first and second half) when one team has a score and the other has no score) (the scenario pattern determination table). In other words, the pattern of the game is classified into five patterns based on the "presence or absence of the score of both teams" and the "transition thereof", an event is determined to be necessary for presenting the course of the game, and the condition required to extract the necessary event is set as the "event extraction condition". The "event extraction order" also is set so as to obtain in the order of importance among the above events determined.

Then for each scenario pattern, the search order of events corresponding to the introduction", "development", "turn", and "conclusion" is set, and the event search condition and the adjustment point of the importance of the obtained event are also set (event extraction adjustment table). For example, in the case where both teams have a score, has the same score/turnabout/winning, then the event is searched in accordance with the "pattern 1". In "pattern 1" the "introduction", "development", "turn", and "conclusion" events are considered as follows:

"introduction": event when the game first moves
"development": offense and defense of both team
"turn": event that settle the course of the game
"conclusion" : event indicative of striking back of losing team.

To extract the events appropriate to the above contents, in the "pattern 1" the events are searched in the order of "turn", "introduction", "development", and "conclusion". The "turn" event is searched by setting the extent to be searched from the play ball (start) of the game to the end of the extent of digest creation" (the end of the extent of digest creation will be referred to as "present" herein below), the last turnabout/tie score/winning event of the winning team or the tie teams, to add +10 to the importance of the appropriate event. The search extent of the "introduction" event is set from the start of the game to the occurrence time of the "turn" event to search the first-to-score event in the kickoff team, and to add +8 to the importance of the appropriate event. "development" event has the search extent being set from the occurrence time of the "introduction" event to the occurrence time of the "turn" event to search any event with high importance without regard to the team, and to add +7 to the importance of the appropriate event. The "conclusion" event has the search extent being set from the occurrence time of the "turn" event to the present time to search any event with high importance in the team opposing to the "turn", and to add +8 to the importance of the appropriate event.

When both teams have a score and without the same score/turnabout/winning, then the event is searched in accordance with "pattern 2". In the pattern 2 the "introduction", "development", "turn", and "conclusion" events are considered as follows:

"introduction": the event that settle the course of the game
"development": offense and defense of both teams
"turn": the event indicative of catching up of losing team
"conclusion": the event indicative of the additional point of the winning team or the strike back of the losing team.

To extract any appropriate events to the above contents, in the "pattern 2", the events are searched in the order of "introduction", "turn", "development", and "conclusion". The "introduction" event has the search extent being set from the play ball (start) of the game to the present time to search the first-to-score event of the kickoff team, and to add +8 to the importance of the appropriate event. The "turn" event has the search extent from the occurrence time of the "introduction" event to the present time to search the last scoring event in the team opposite to the "introduction" and to add +10 to the appropriate event. The "development" event has the search extent being set from the occurrence time of the "introduction" event to the occurrence time of the "turn" event to search any event with high importance without regard to the team, and to add +6 to the importance of the appropriate event. The "conclusion" event has the search extent being set from the occurrence time of the "turn" event to the present time to search any event with high importance without regard to the tem and to add +7 to the importance of the appropriate event.

Events are searched in accordance with "pattern 3" when one team has a score and has been kicked off in the first half. In the "pattern 3" the "introduction", "development", "turn", and "conclusion" events are considered as follows:

"introduction": the event that settle the course of the game
"development": offense and defense of both teams
"turn": the event indicative of the striking back of losing team
"conclusion": the event indicative of the additional point of winning team, or the striking back of the losing team.

To extract the events appropriate to the above situation, in the "pattern 3" the events are searched in the order of "introduction", "turn", "development", and "conclusion". The "introduction" event has the search extent being set from the play ball (start) of the game to the present time to search the first-to-score event of the kickoff team and to add +8 to the appropriate event. The "turn" event has the search extent being set from the occurrence time of the "introduction" event to the present time to search any event with high importance in the team opposite to "introduction" and to add +10 to the appropriate event. The "development" event has the search extent being set from the occurrence time of the "introduction" event to the occurrence time of the "turn" event to search any event with high importance without regard to the team, and to add +5 to the importance of the appropriate event. The "conclusion" event has its search extent being set from the occurrence time of the "turn" event to the present time to search any event with high importance without regard to the team and to add +5 to the appropriate event.

Events are searched in accordance with "pattern 4" when either team has a score and has been kicked off in the second half. In the "pattern 4" the "introduction", "development", "turn", and "conclusion" events are considered as follows:

"introduction": offense and defense of both team
"development": offense and defense of both team
"turn": the event that settle the course of the game
"conclusion": the event of the striking back of losing team To extract any appropriate events to the above situation, in the "pattern 4", the events are searched in the order of "turn", "development", "introduction", and "conclusion". The "turn" event has its search extent being set from the play ball (start) of the game to the present time to search the first-to-score event of the kicking off team and to add +8 to the importance of the appropriate event. The "development" event has its search extent being set from the play ball (start) of the game to the occurrence time of the "turn" event to search any event with high importance without regard to the team and to add +5 to the importance of the appropriate event. The "introduction" event has its search extent being set from the play ball (start) of the game to the occurrence time of the "development" event to search any event with high importance without regard to the team and to add +6 to the importance of the appropriate event. The "conclusion" event has its search extent being set from the occurrence time of the "turn" event to the present time to search any event with high importance in the team opposite to the "turn" and to add +5 to the importance of the appropriate event.

Events are searched in accordance with "pattern 5" when neither team has any score. In the "pattern 5" the "introduction", "development", "turn", and "conclusion" events are considered so as to indicate the offense and defense of both teams and any appropriate events are searched in the order of "turn", "development", "introduction", and "conclusion". The "turn" event has its search extent being set from the play ball (start) of the game to the present time to search any events with high importance without regard of the team, and to add +7 to the importance of the appropriate event. The "development" event has its search extent being set from the play ball (start) of the game to the occurrence time of the "turn" event to search any events with high importance without regard to the team and to add +5 to the importance of the appropriate event. The "introduction" event has its search extent being set from the play ball (start) of the game to the occurrence time of the "development" event to search any event with high importance without regard to the team and to add +6 to the importance of the appropriate event. The "conclusion" event has its search extent being set from the occurrence time of the "turn" event to the present time to search any events with high importance without regard to the team, and to add +5 to the importance of the appropriate event.

Now referring to FIG. 5, there is shown a schematic flow diagram indicative of the processing procedure of the event importance adjustment device 10. The receiving unit 11 receives the event information with importance and the situation information to accumulate in the event information with importance and situation information accumulator unit 12 (step 1). The scenario importance adjusting unit 14 obtains the digest scenario information from the digest scenario information storing unit 13 at the specified timing (step 2), then based on the digest scenario information, it recalculates the event importance included in the event information with importance (step 3).

Figure 6:
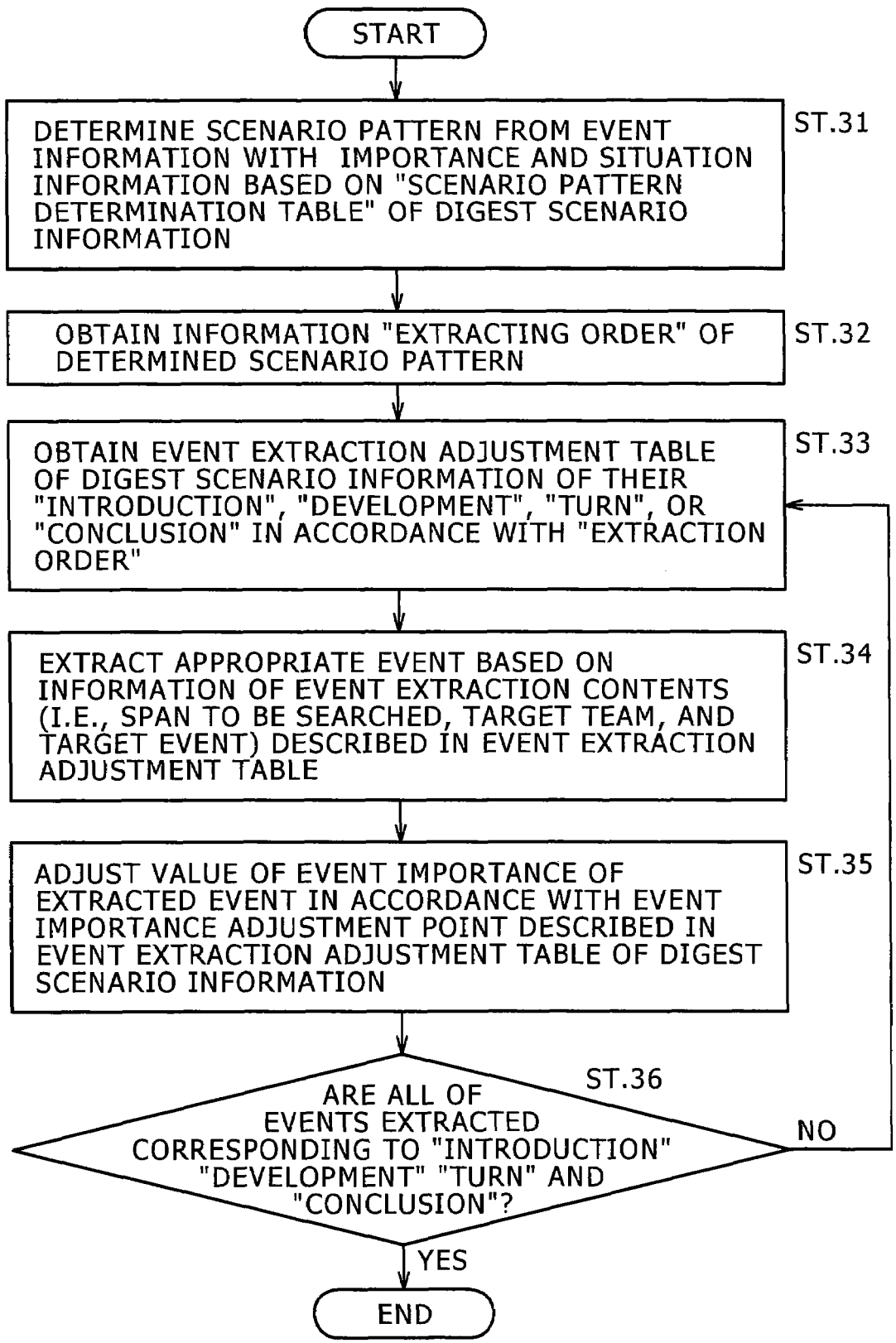
FIG. 6 shows a schematic flow diagram indicative of the procedure of the event extraction adjustment process in accordance with the first embodiment of the present invention.
Figure 7:
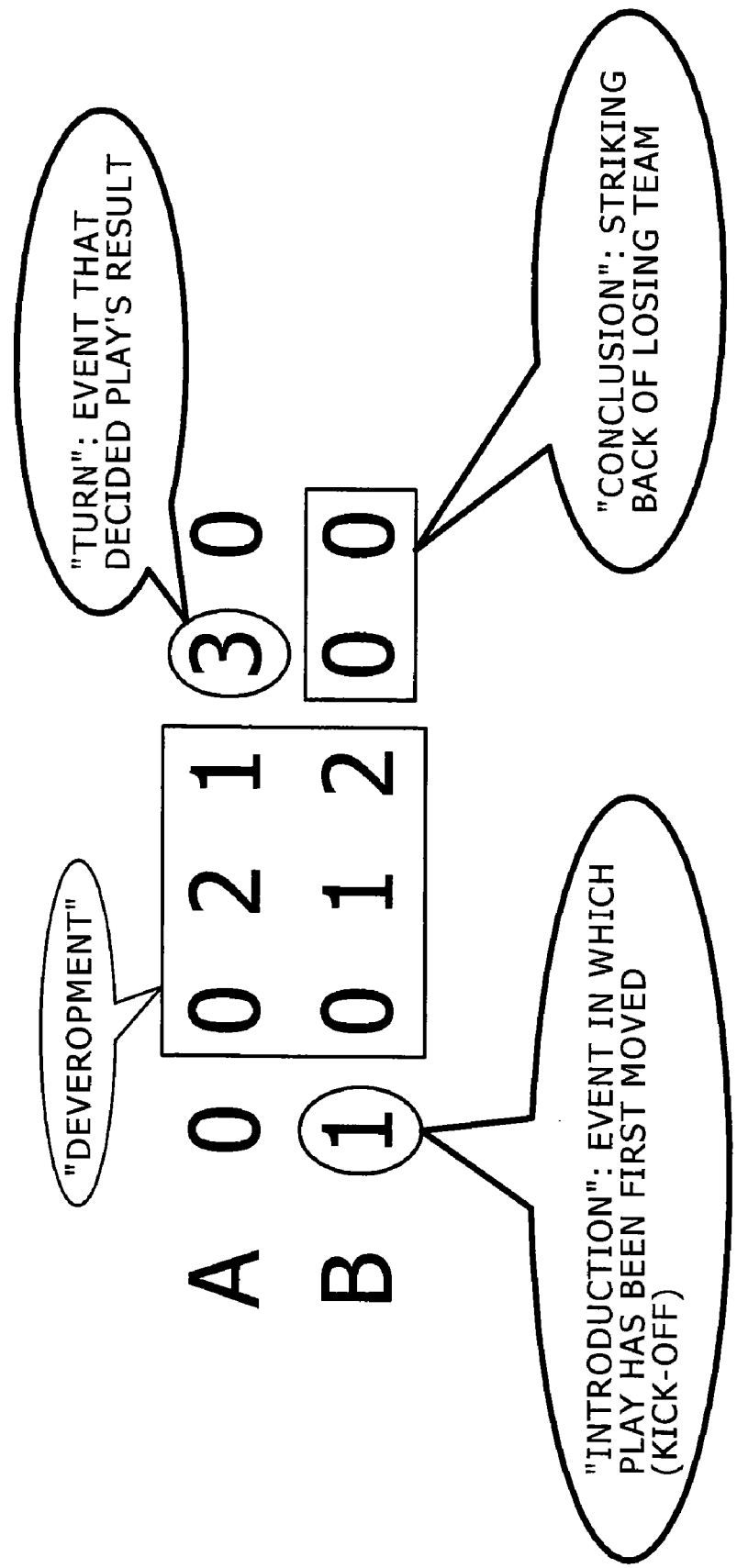
FIG. 7 shows a schematic diagram indicative of the position or extent of the introduction, development, turn, and conclusion set by the event extraction adjustment process in accordance with the first embodiment of the present invention (in case of scenario pattern No. 1)

The processing performed in the scenario importance adjusting unit 14 is described in FIG. 6 in greater details. More specifically, from the obtained event information with importance and the situation information, the information is retrieved to apply the "scenario pattern determination table" of the digest scenario information, then the scenario pattern is determined based on the table (step 31). Then, the "extraction order" information of thus determined scenario pattern is retrieved (step 32), and based on the "extraction order" the event extraction adjustment table of the digest scenario information of "introduction", "development", "turn", or "conclusion" is obtained (step 33), then based on the event extraction table presented in the event extraction adjustment table (information about the search extent, the search target team, and the search target information) any appropriate events are extracted (step 34). Next, based on the event importance adjustment point (P) presented in the event extraction adjustment table of the digest scenario information, the value of the importance of the extracted event is adjusted (step 36). These steps 33 to 35 are iteratively repeated until all of the events corresponding to the "introduction", "development", "turn", and "conclusion" are extracted (step 36). The output unit 17 outputs the event information with importance that the value of event importance has been adjusted by the scenario importance adjusting unit 14 (step 4).

FIGS. 7 to 11 shows the events corresponding to the "introduction", "development", "turn", and "conclusion", or the selection extent by use of the information on the score board of both A and B teams when the game course of the game matches with any one of scenario patterns. The creation of a digest is predetermined to be performed in the first half of the seventh inning. Now referring to FIG. 7, there is shown the course of the game corresponding to the scenario pattern 1, in which the definitive event at the first half of the fifth inning is selected as the "turn" event, the event at the second half of the first inning where the game first moved is selected as "introduction" event, the event with high importance in the range from the first half of the second inning to the second half of the fourth inning, is selected as "development" event, and the event with high importance in the extent from the second half of the fifth inning to the second half of the sixth inning is selected as the "conclusion" event indicative of the striking back of the losing team.

Figure 8:
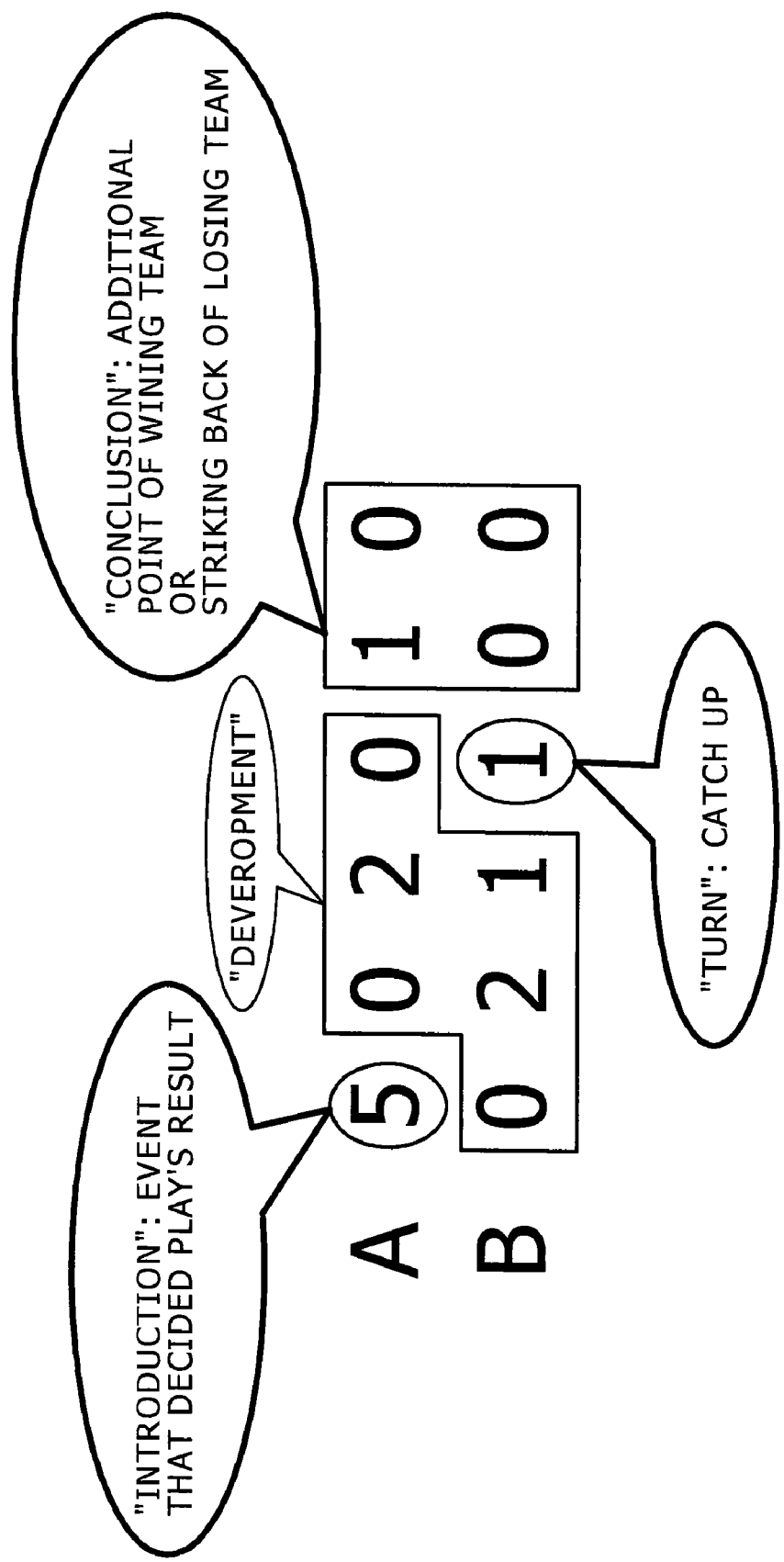
FIG. 8 shows a schematic diagram indicative of the position or extent of the introduction, development, turn, and conclusion set by the event extraction adjustment process in accordance with the first embodiment of the present invention (in case of scenario pattern No. 2)

Now referring to FIG. 8, there is shown an example of the course of the game corresponding to the scenario pattern 2, in which an event in the first half of the first inning which settled the game is selected as the "introduction" event, an event in the second half of the fourth inning indicative of the striking back of the losing team is selected as the "turn" event, an event with high importance in the extent from the second half of the first inning to the first half of the fourth inning is selected as the "development" event, and an event with high importance at the time when the winning team adds a scoring point or the losing team has struck back in the extent from the first half of the fifth inning to the second half of the sixth inning is selected as the "conclusion" event.

Figure 9:
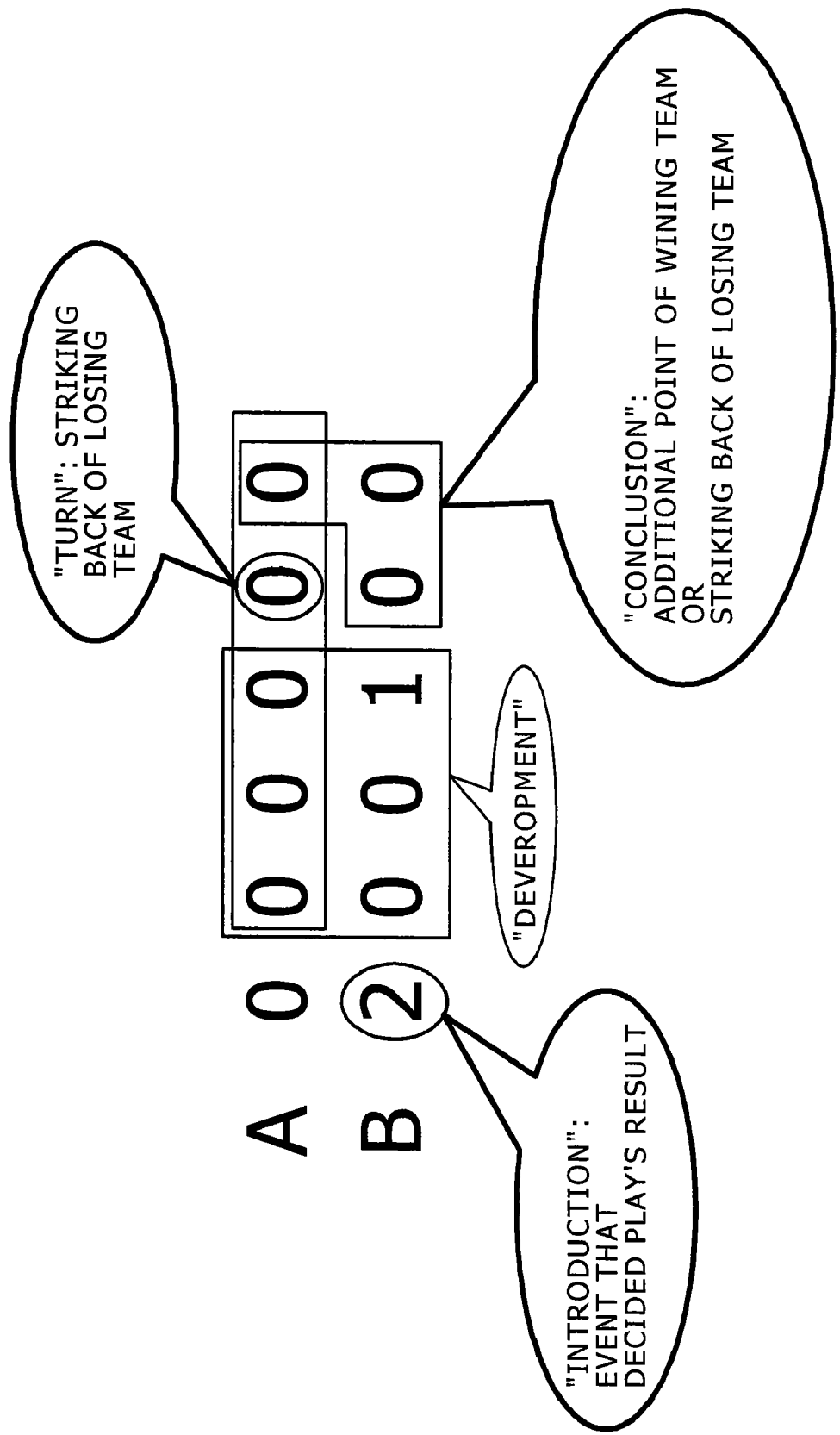
FIG. 9 shows a schematic diagram indicative of the position or extent of the introduction, development, turn, and conclusion set by the event extraction adjustment process in accordance with the first embodiment of the present invention (in case of scenario pattern No. 3)

Now referring to FIG. 9, there is shown an example of the course of the game corresponding to the scenario pattern 3, in which an event in the second half of the first inning which settled the course of the game is selected as the "introduction" event, the event indicative of the striking back of the losing team in the first halves of the second to sixth innings is selected as the "turn" event (in this example the event in the first half of the fifth inning is determined to be "turn" event based on the assumption that an event with high importance is present in the first half of the fifth inning), an event with high importance in the extent from the first half of the second inning to the second half of the fourth inning is selected as the "development" event, and an event with high importance in the extent from the second half of the fifth inning to the second half of the sixth inning is selected as the "conclusion" event when the winning team added a score or the losing team has struck back.

Figure 10:
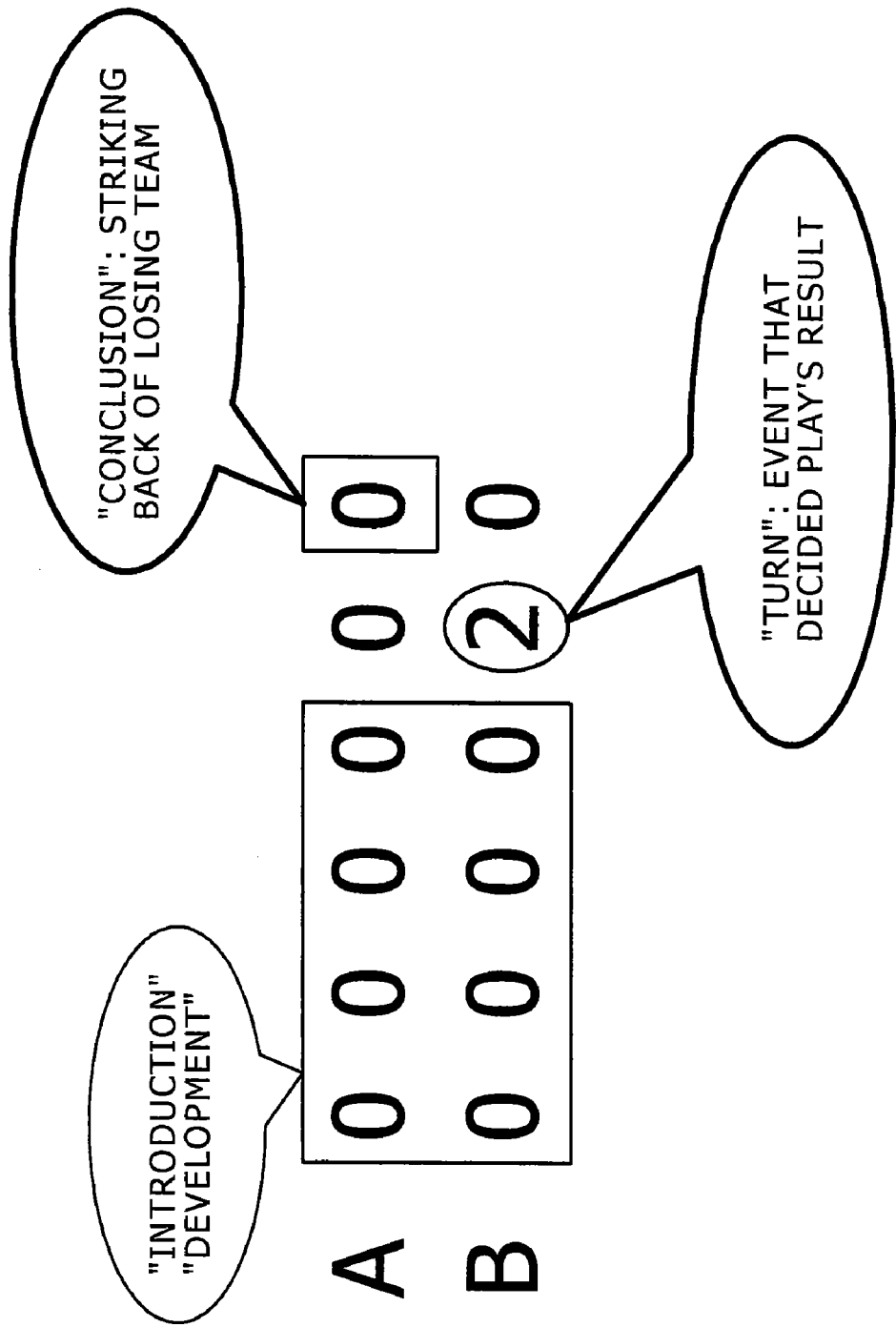
FIG. 10 shows a schematic diagram indicative of the position or extent of the introduction, development, turn, and conclusion set by the event extraction adjustment process in accordance with the first embodiment of the present invention (in case of scenario pattern No. 4)
Figure 11:
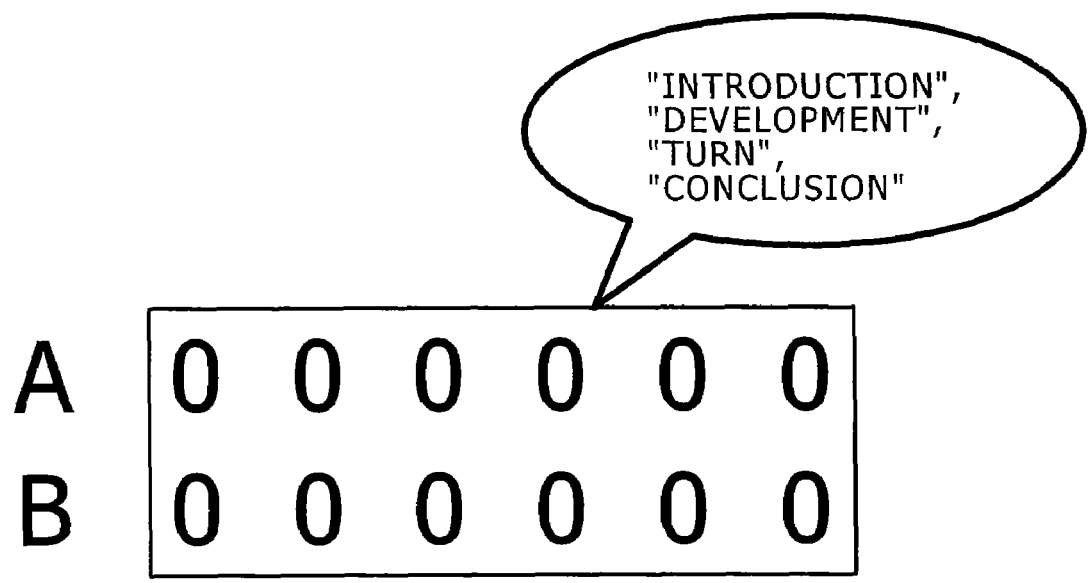
FIG. 11 shows a schematic diagram indicative of the position or extent of the introduction, development, turn, and conclusion set by the event extraction adjustment process in accordance with the first embodiment of the present invention (in case of scenario pattern No. 5)

Now referring to FIG. 10, there is shown an example of the course of the game corresponding to the scenario pattern 4, in which an event in the second half of the fifth inning which settled the course of the game is selected as the "turn" event, events with high importance in the extent from the first half of the first inning to the second half of the fourth inning are selected as the "introduction" and "development" events, and an event with high importance in the first half of the sixth inning which indicates the striking back of the losing team is selected as the "conclusion" event. FIG. 11 shows an example of the course of the game corresponding to the scenario pattern 5, in which events with high importance in the extent from the first half of the first inning to the second half of the sixth inning are selected as events corresponding to the "introduction", "development", "turn", and "conclusion".

As can be appreciated from the foregoing description, the course of the game can be adapted as a scenario, and the events corresponding to the "introduction", "development", "turn", and "conclusion" of the scenario are searched to adjust the importance of the events to allow the automated production of a digest which reflects the course of the game. In this manner, the extent of event extraction with the course of the game taken into account is set to retrieve events in the game dispersedly, so that it can improve from the extraction of events occurred intensively in a short period of time (solving the problem of "timely tight formation"). In addition, since the combination of meaningful events are extracted conforming to the "introduction", "development", "turn", and "conclusion", it allows the improvement from the cumulative extraction of events having similar contexts (solving the problem of "cumulative extraction"). Therefore the event information with adjusted importance may be used to create a digest which allows the reviewing of the course of the game in addition to the local and partial digest.

Second Embodiment

The event importance adjustment method in accordance with the second embodiment of the present invention is characterized in that it adjusts the importance of events by taking into account the relationship between events. Now referring to FIG. 12, there is shown an overview of the event importance adjustment device 10 for implementing this method. This event importance adjustment device 10 includes a receiving unit 11 for receiving the event information with importance including the event information indicative of the context of the event with the importance added as well as the situation information indicative of the state of the score and runners, an event information with importance and situation information accumulator unit 12 for accumulating the received event information with importance and the situation information, an event correlation pattern table storing unit 15 for storing the event correlation pattern table indicative of the importance adjustment points of the relative events, an event relation importance adjusting unit 16 for adjusting the importance of the event information with importance based on the event correlation pattern table, and an output unit 17 for outputting the event information with importance having the importance adjusted. The event relation importance adjusting unit 16 may be implemented by performing a program for defining the operation by a computer built into the event importance adjustment device 10.

The data structure of the event information with importance and the situation information to be inputted to the receiving unit 11 is just identical to that shown in the first embodiment (see FIG. 2 and FIG. 3). In the event correlation pattern table, as shown in FIG. 13, there are included a "trigger event title" of the trigger event, which triggers the re-evaluation of the event importance, a "relational extent" indicative of the searching extent of the event which contributed to the trigger event and is to be re-evaluated, and an "adjustment point of the correlation event importance" for adjusting the importance of the target correlation events.

For example, when a home run is the trigger event, then the shorter one of the period of time from the starting of the inning to the occurrence time of the trigger event and the start time of the on-base situation that a runner first has get on the base to the occurrence time of the trigger event may be set as the correlative extent, and if the third base hit has been searched and found as the correlative target event from within the correlative extent, +7 is added to the importance of the event, if a balk is found as the relation target event from within the correlative extent, then +5 is added to the importance of the event. If a hit is the trigger event, then the event immediately preceding it is set as the correlational extent; if a sacrifice hit immediately precedes it, then +6 is added to the importance of the event, or if a sacrifice bunt immediately precedes it, then +3 is added to the importance of the event.

Now referring to FIG. 14, there is shown the processing procedure of the event importance adjustment device 10. The receiving unit 11 receives the event information with importance and the situation information to accumulate into the event information with importance and situation information accumulator unit 12 (step 1). The event relation importance adjusting unit 16 refers to the event relation pattern table stored in the event relation pattern table storing unit 15 to obtain the trigger event information that is set therein (step 5). Then it is determined whether or not the event is a trigger event from the information of the received event (step 6), and if it is determined as a trigger event, then the correlation target event is extracted to perform the "correlation event extraction adjustment process" to adjust the importance (step 7).

Figure 15:
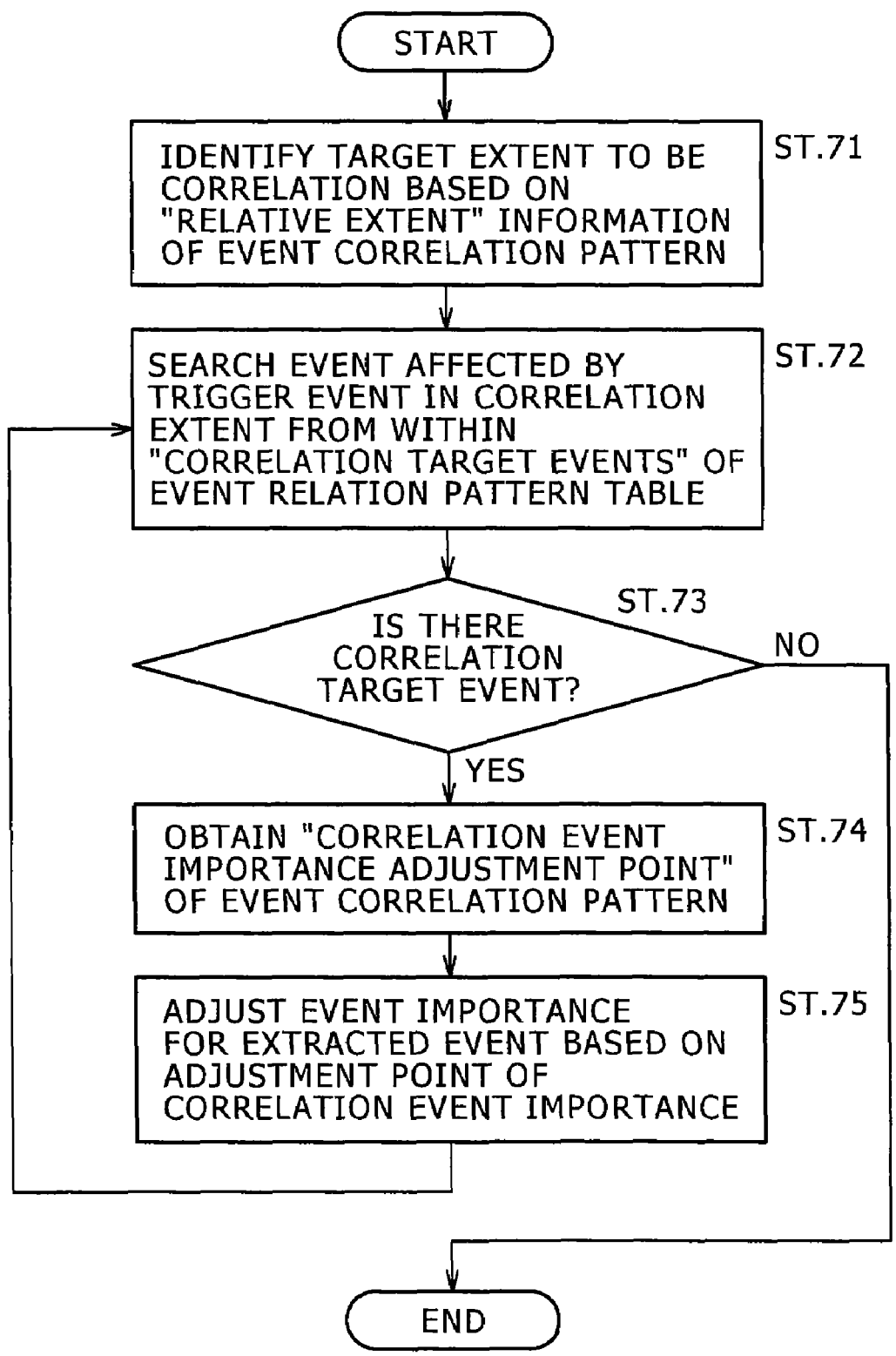
FIG. 15 shows a schematic flow diagram indicative of the procedure of correlation event extraction adjustment process in accordance with the second embodiment of the present invention.

The correlation event extraction adjustment process is performed as shown in FIG. 15.

More specifically, based on in the "correlational extent" information of the event relation pattern table, the search extent of the correlation target is identified (step 71), the "correlation target event" (an event which is affected by the trigger event) set in the event relation pattern table is searched (step 72). If there is not a correlation target event in the correlation extent, then the process terminates; if there is one, then (step 73) the "correlation event importance adjustment table" of the event relation pattern table is obtained (step 74), and then the importance of the extracted event is adjusted based on the correlation event importance adjustment table (step 75). The output unit 17 outputs the event information with importance with the event importance adjusted by the event relation importance adjusting unit 16 (step 8).

Figure 16:
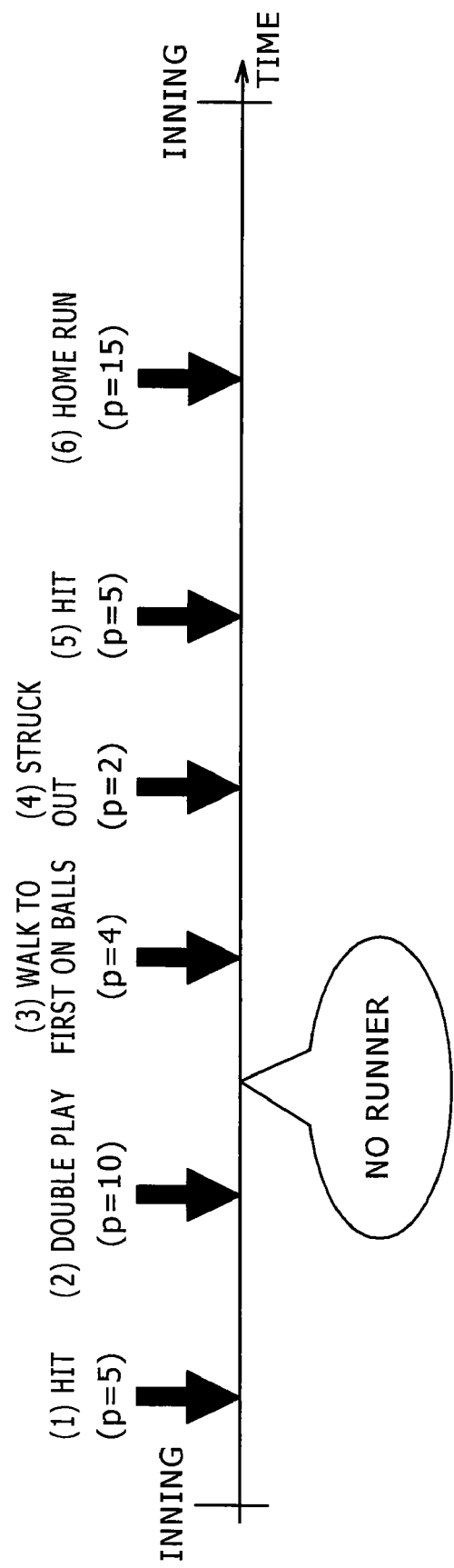
FIG. 16 shows a schematic diagram illustrating a typical example of the correlation event extraction adjustment processing in accordance with the second embodiment of the present invention (showing events before adjustment)
Figure 17:
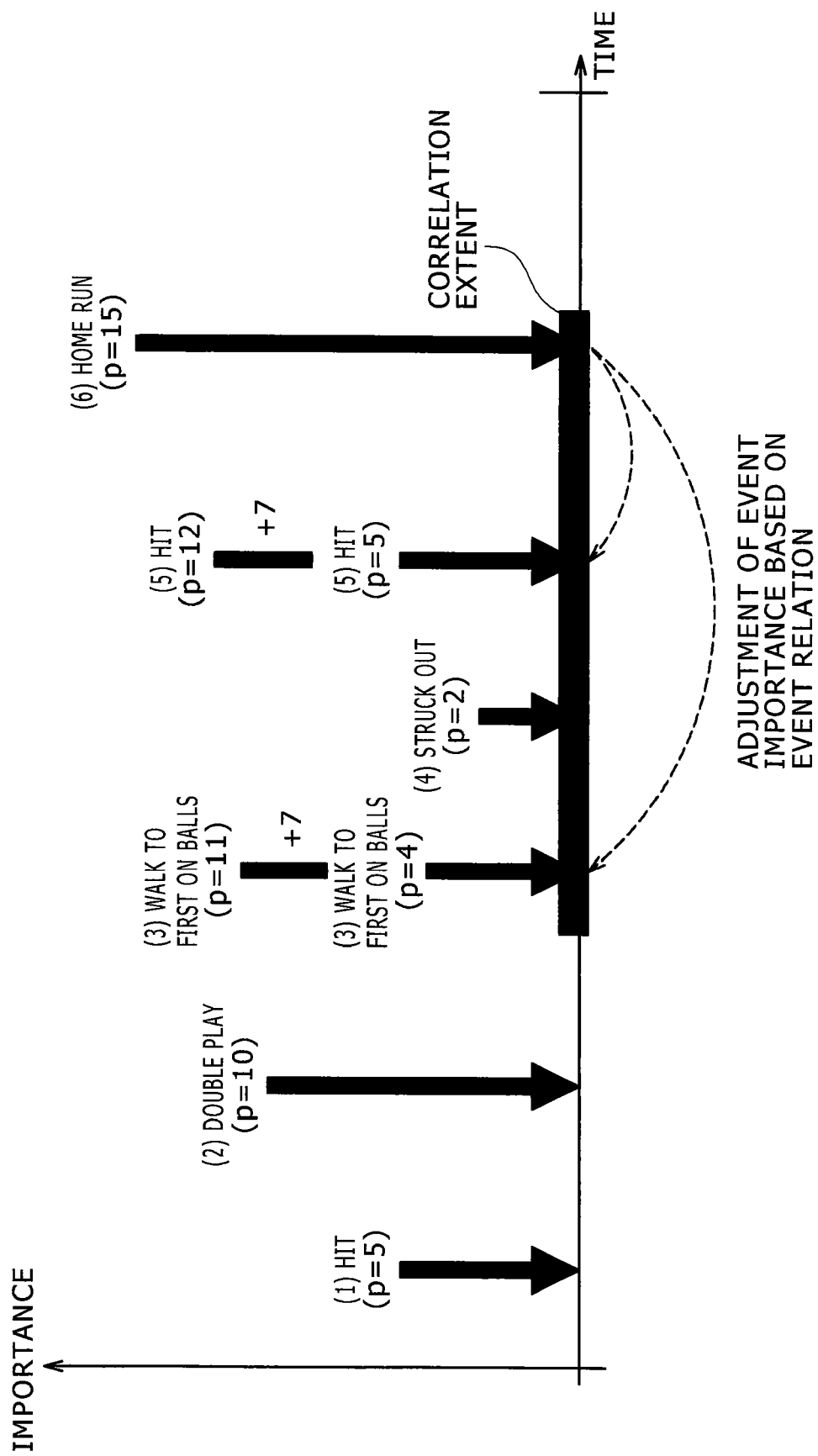
FIG. 17 shows a schematic diagram illustrating a typical example of the correlation event extraction adjustment processing in accordance with the second embodiment of the present invention (showing the event importance after adjustment)

FIG. 16 and FIG. 17 show a typical example of the correlation event extraction adjustment process. Now referring to FIG. 16, there is shown the event information with importance and the situation of event and runners indicated in the situation information are shown as time series (in the figure "p" indicates the event importance) A series of event information with importance is accumulated in the order of (1) to (6). As the "home run" is defined as the trigger event in the event correlation pattern table, the correlation event extraction adjustment process is initiated when the "(6) home run" is received. First, the "correlation extent" information in the event correlation pattern table is obtained. Since all the runners are wiped out at the time of double play, the event in which a runner first get to the first base is the "(4) walk on balls", and the correlation extent is in the range from the "(4) walk on balls" to the "(6) home run", as shown in FIG. 17.

Based on the correlation target event of the event correlation pattern table, the event of the "correlation extent" is extracted. As the correlation extent contains the correlation target event of "(3) walk on balls" and "(5) hit", these two events are extracted, and based on "the correlation event importance adjustment table" of the event correlation pattern table the event importance of the "(3) walk on balls" (p=4) is added with 7, so that the event importance of "(3) walk on balls" is adjusted to "11". In a similar manner the event importance of the "(5) hit" (p=5) is added with 7 so that the event importance of the "(5) hit" is adjusted to "12". As the result of the adjustment of the event importance based on the event correlation, the event importance of each event is as shown in FIG. 17.

As can be appreciated from the foregoing description, in the event importance adjustment device 10, at the time of occurrence of an event which may be considered as a trigger, the value of the event in the specified extent is re-evaluated based on the event correlation pattern table, so that not only the moment of the occurrence of the event is re-evaluated but also the event importance is adjusted in the viewpoint of whether or not the succeeding event is alive (correlated) In this method the value of the preceding event is re-evaluated by the succeeding event, and the correlation of these events is taken into account to adjust the event importance, so as to allow a digest to be automatically created by considering the course of the game more intensively by use of the event information with importance adjusted.

Third Embodiment

Figure 18:
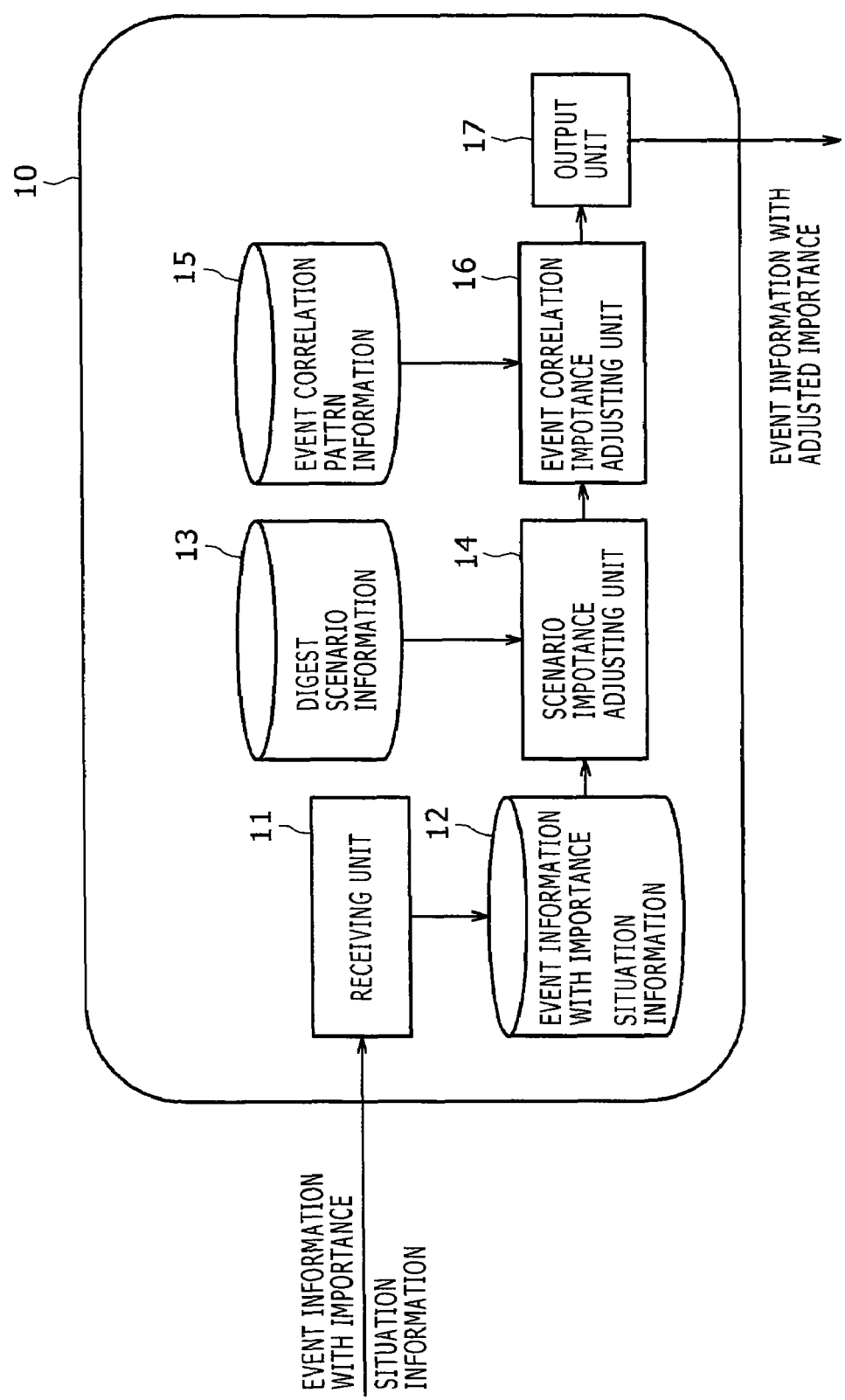
FIG. 18 shows a schematic block diagram indicative of the arrangement of an event importance adjustment device in accordance with a third embodiment of the present invention.

The third embodiment of the present invention is characterized in that the method implemented in the first embodiment and that in the second embodiment are combined to perform the adjustment of event importance. FIG. 18 shows an event importance adjustment device 10 for implementing this method. Now referring to FIG. 18, the event importance adjustment device 10 includes a receiving unit 11 for receiving the event information with importance with the event information indicative of the context of the event with the importance added, and the situation information indicative of the state of the score and runners, an event information with importance and situation information accumulator unit 12 for accumulating the received event information with importance and the situation information, a digest scenario information storing unit 13 for storing the digest scenario information, a scenario importance adjusting unit 14 for adjusting the event information with importance based on the digest scenario information, an event relation pattern table storing unit 15 for storing the event correlation pattern table, an event relation importance adjusting unit 16 for adjusting the importance of the event information with importance based on the event correlation pattern table, and an output unit 17 for outputting the event information with importance that the importance is adjusted.

The data structure of the event information with importance and the situation information to be inputted to the receiving unit 11 is identical to that shown in the first embodiment of the present invention (see FIG. 2 and FIG. 3). The digest scenario information is similar to that already described in the first embodiment (see FIG. 4), and the event correlation pattern table is the same as that described in the second embodiment (see FIG. 13).

Figure 19:
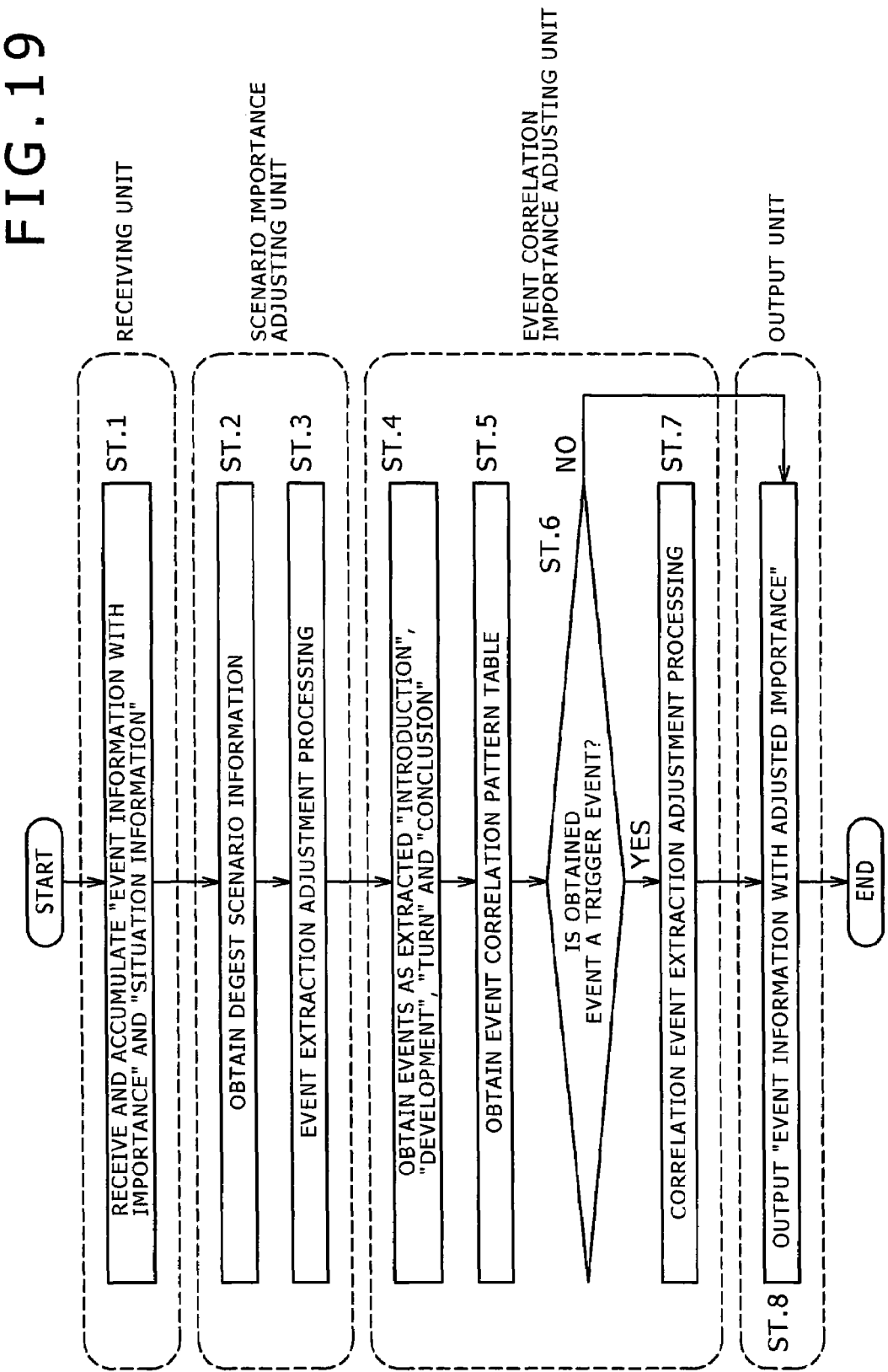
FIG. 19 shows a schematic flow diagram indicative of the processing procedure in the event importance adjustment device in accordance with the third embodiment of the present invention.
Figure 20:
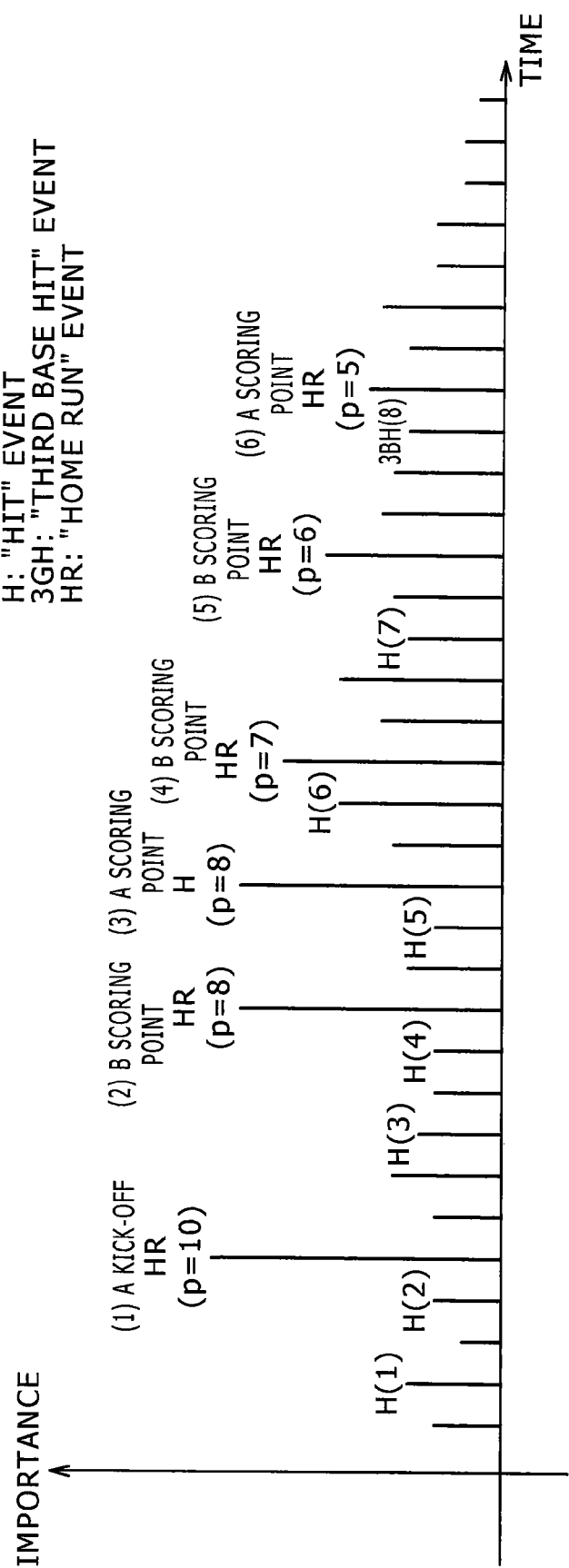
FIG. 20 shows a schematic diagram illustrating a typical example of the event importance adjustment process in accordance with the third embodiment of the present invention (showing the event importance before adjustment)

Now referring to FIG. 19, there is shown the processing procedure of the event importance adjustment device 10. The receiving unit 11 receives the event information with importance and the situation information to accumulate to the event information with importance and situation information accumulator unit 12 (step 1). The scenario importance adjusting unit 14 obtains the digest scenario information from the digest scenario information storing unit 13 at the specified timing (step 2), then recalculates the event importance included in the event information with importance based on the digest scenario information (step 3).

The processing performed in the scenario importance adjusting unit 14 is performed in the procedure shown in FIG. 6 as have been described in the first embodiment, the scenario importance adjusting unit 14 extracts events corresponding to the "introduction", "development", "turn", and "conclusion" to adjust the importance of these events.

The event relation importance adjusting unit 16 obtains the situation information and the event information with importance that the event importance is adjusted by the scenario importance adjusting unit 14 which importance is corresponding to the "introduction", "development", "turn", and "conclusion" (step 4). Then it refers to the event correlation pattern table stored in the event relation pattern table storing unit 15 to obtain the information of the trigger event set therein (step 5). Then it determines whether or not an event corresponding to the "introduction", "development", "turn", and "conclusion" is a trigger event (step 6), if an event is not the trigger event then it outputs to the output unit 17 the obtained event information with importance. If otherwise an event corresponding to the "introduction", "development", "turn", and "conclusion" is a trigger event then it extracts the correlation target event therefrom to perform the correlation event extraction adjustment process to adjust the importance of the obtained event (step 7).

The correlation event extraction adjustment process is performed in accordance with the procedure shown in FIG. 15, as have been described in the second embodiment of the present invention. More specifically, the event relation importance adjusting unit 16 outputs to the output unit 17 the event information with importance having the value of event importance adjusted by the correlation event extraction adjustment process, then the output unit 17 in turn outputs the event information with importance having the importance adjusted by the scenario importance adjusting unit 14 and the event relation importance adjusting unit 16 (step 8).

Figures 21, 22:
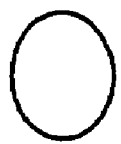
FIG. 21 shows a schematic diagram illustrating a typical example of the event importance adjustment process in accordance with the third embodiment of the present invention (showing the relationship between the score displayed in a scoreboard and the events)
FIG. 22 shows a schematic diagram illustrating a typical example of the event importance adjustment process in accordance with the third embodiment of the present invention (showing the relationship between the score displayed in a scoreboard and the events of introduction, development, turn, and conclusion)

FIG. 20 to FIG. 23 show a typical example of the process done by the device. Now referring to FIG. 20, there is shown the event and score information indicated in the event information with importance and the situation information in the time series (where p indicates the event importance). FIG. 21 shows the information displayed on the score board, where (1) to (6) indicates the innings in which high importance events shown in FIG. 20 occurred. The scenario importance adjusting unit 14 extracts the following events as events corresponding to the "introduction", "development", "turn", and "conclusion", based on the event extraction adjustment table so as to adjust the event importance as follows:

"introduction" event: (1) A kickoff HR event, importance adjusted from 10 to 18;

"development" event: (3) A scoring H event, importance adjusted from 8 to 14;

"turn" event: (5) B scoring H event, importance adjusted from 6 to 16;

"conclusion" event: (6) A scoring HR event, importance adjusted from 5 to 12.

Now referring to FIG. 22 there are shown innings where events corresponding to the "introduction", "development", "turn", and "conclusion" occurred. The event relation importance adjusting unit 16 selects, based on the event correlation pattern table, the events which may be good candidates of trigger events from within the events corresponding to the "introduction", "development", "turn", and "conclusion". The following events are selected as the trigger:

"introduction" event: (1) A kickoff HR event; and

"conclusion" event: (6) A scoring HR event.

Then, the event relation importance adjusting unit 16 performs the correlation event extraction adjustment process to adjust the importance of the correlation target event as follows:

the correlation target event of "(1) A kickoff HR" event

"H (1)" event: importance +7

"H (2)" event: importance +7 the correlation target event of "(6) A scoring HR" event

"3BH (8)" event: importance +7

Figure 23:
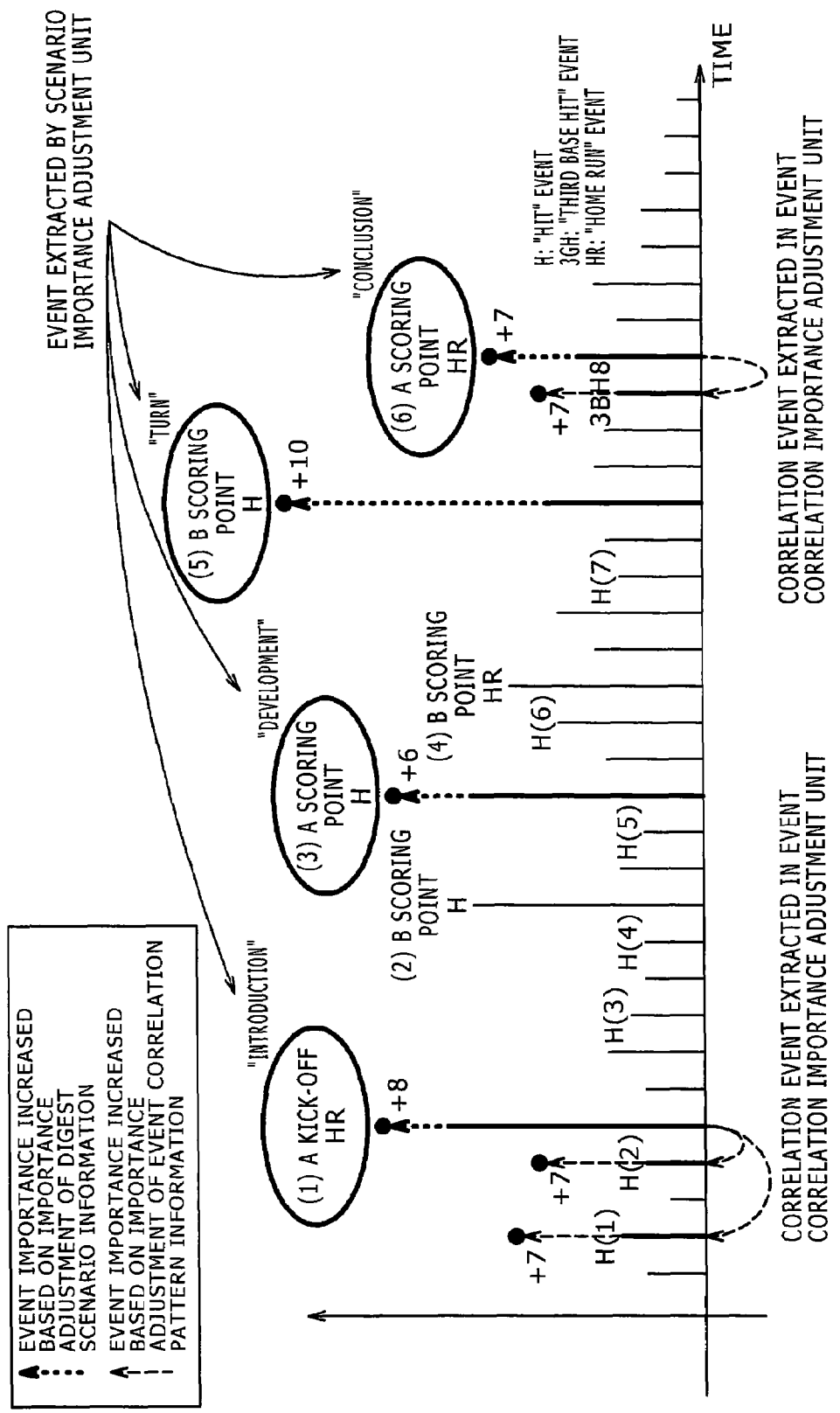
FIG. 23 shows a schematic diagram illustrating a typical example of the event importance adjustment process in accordance with the third embodiment of the present invention (showing the event importance after adjustment)

In FIG. 23, there is shown the importance of those events adjusted by the scenario importance adjusting unit 14 and the event relation importance adjusting unit 16.

As can be appreciated from the foregoing description, in the event importance adjustment device 10, the importance adjustment can be done by taking into account both of the course of the game and the event correlation in accordance with the pattern of the game set based on the presence or absence of the score of both teams" and the "transition". In this case the events corresponding to the "introduction", "development", "turn", and "conclusion" are trigger events, so that the correlation events in relation to the "introduction", "development", "turn", and "conclusion" have the higher importance, the effect of setting the "introduction", "development", "turn", and "conclusion" is prompt in comparison with the first embodiment of the present invention. Not only the adjustment of the event importance in the "introduction", "development", "turn", and "conclusion" event itself is performed but also the adjustment of the importance of the events having the correlation with the event is performed to allow affecting the "introduction", "development", "turn", and "conclusion" to the "event group".

Fourth Embodiment

In the first to third embodiments of the present invention as have been described above, the digest scenario information is set based on the "presence or absence of the score of both teams" and the "transition thereof". The fourth embodiment of the present invention is characterized in that the game is classified into seven patterns based on the "presence or absence of the score of both teams" and the "transition thereof", then an event necessary for presenting the course of the game is determined, and then the condition required for extracting the event is set as the "event extraction condition". In addition, it is characterized in that it sets "event extraction order" as a necessary condition for obtaining the event in the order of importance from among the determined events. Furthermore it is characterized in that it selects events for presenting the course of the game not limited to four points of "introduction", "development", "turn", and "conclusion".

When classifying the patterns of the games based on the "presence or absence of the score difference between teams" and "the transition thereof", there are many patterns of the games such as for example a case in which one team is considerably superior to the other, a case in which both teams score and make a seesaw battle, or a case in which neither team scores anything, and so on. Depending on the pattern of the game an important event for presenting the course of the game may vary. For example, when one team is overwhelmingly dominating, there is as an important event "the scene of a batter scoring", therefore it is preferable for the digest scene that a plurality of such events be extracted. Also, when both teams make a competition as a seesaw battle, the important event is the "turnabout" scene, therefore it is preferable to extract a plurality of such events into the digest scene. Further, when both teams score nothing, then the important event is the "good pitching scene of the pitcher", therefore it is preferable to extract a plurality of such events.

Figure 24:
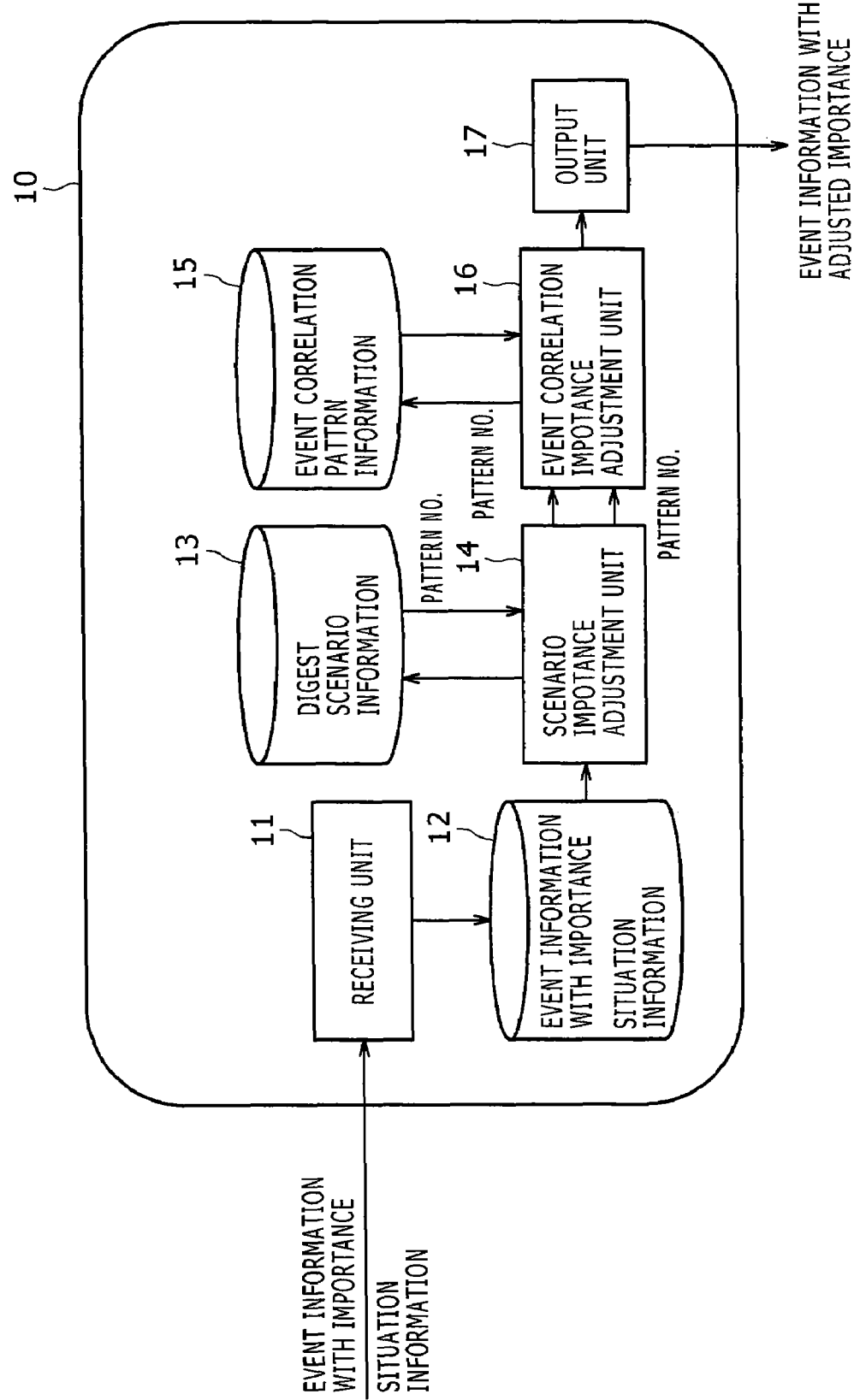
FIG. 24 shows a schematic block diagram indicative of the arrangement of an event importance adjustment device in accordance with a fourth embodiment of the present invention.

Now referring to FIG. 24, there is shown the arrangement of the event importance adjustment device 10 which implements the method described above. The event importance adjustment device 10 includes a receiving unit 11 for receiving the event information with importance with the event information indicative of the event context with the importance added thereto, and the situation information indicative of the situation of the score and the runners, an event information with importance and situation information accumulator unit 12 for accumulating thus received event information with importance and the situation information, a digest scenario information storing unit 13 for storing the digest scenario information, a scenario importance adjusting unit 14 for adjusting the importance of the event information with importance based on the digest scenario information, an event relation pattern table storing unit 15 for storing an event correlation pattern table, an event relation importance adjusting unit 16 for adjusting the importance of the event information with importance based on the event correlation pattern table, and an output unit 17 for outputting the event information with importance after adjustment of the importance.

The data structure of the event information with importance and the situation information to be input to the receiving unit 11 is almost identical to that described in the first embodiment of the present invention (see FIG. 2 and FIG. 3). However, as shown in FIG. 25, the event information with importance in accordance with the embodiment comprises an event identifier, and as shown in FIG. 26 the situation information has a score information identifier and a runner situation identifier. For example for the score information identifier of the situation information, an identifier is added to the situation information each time the score changes, and for the runner situation identifier an identifier is added each time a runner reaches a base (see FIG. 27).

The digest scenario information in accordance with the embodiment is associated with the pattern number (from 1 to 7) that is classified for each game context, the scoring context (a score of the winning team/a score of the losing team), the difference of the scores, the transition of the score difference, the number of times of beating the opposing team, as well as the number of times of scoring the tying run, and so on (the scenario pattern determination table). The context of the game may include for example an overwhelming victory, a great victory, a complete victory, victory by a narrow margin, a tight battle, a victory by sticking it out, a drawn game, and so on, and the pattern numbers 1 to 7 correspond thereto. Then, for presenting the course of the game in each of the patterns, there are set the events to be selected and the order of selection thereof, the search extent, and the adjustment point of the event importance (event extraction adjustment table). For example, from the scoring situation of both teams when the scoring difference is "more than 7 points (large)", the transition of the scoring difference is "more than 4 to 6 points prior to the middle of the game", the number of turnabout is "zero after the middle of the game", and the number of scoring the tying run is "zero after the middle of the game", then the "pattern 1 (an overwhelming victory) is extracted, so as to search events thereby. In the "pattern 1", the search target events are as follows:

"scene 1" : an event of scoring point by the winning team (the winning point);

"scene 2" : an event of scoring point by the winning team (the additional point);

"scene 3" : an event of easy fly or struck out by the losing team;

"scene 4" : an event of scoring point by the winning team (the addition point for an insurance run); and "scene 5" : an event of easy fly or struck out by the losing team.

To extract events suitable to the above context, then "pattern 1" searches the events in the order of "scene 1", "scene 4", "scene 2", "scene 3", and "scene 5". In accordance with the presence or absence of the difference of scoring and the transition thereof, the pattern 1 searches at first the "event that settled the course of the game" and the "event with a high event importance". In other words, the most important point for the course of the game is searched at first, and this concept is derived and incorporated from the extraction order as have been described in the description of the first to third embodiments above. Then as a means for determining the order of extracting events in correspondence with the pattern of the course of the game (the difference of scoring points and the transition thereof), as similar to the order determination of the "introduction", "development", "turn", and "conclusion", candidates of "introduction" and "turn" are extracted in accordance with the pattern of the course of the game, such as for example "introduction 1", "introduction 2", "development 1", "turn 1", "turn 2", "turn 3", "conclusion 1" and so on.

For the event of the "scene 1" the search extent is set from the play ball (start) of the game to the present time to search the scoring event which is the winning point of the winning team, then +1000 is added to the importance of the appropriate event. For the event of the "scene 4" the search extent is set from the occurrence time of the event of the "scene 1" to the present time to search backwardly the scoring event which is the additional point for the insurance run in the winning team, then +1000 is added to the appropriate event. For the event of the "scene 2" the search extent is set from the occurrence time of the event of the "scene 1" to the present time to search forwardly the scoring event which is the additional point for the winning team, then +3000 is added to the appropriate event. For the event of the "scene 3" the search extent is set from the play ball (start) of the game to the occurrence time of the event of the "scene 4" to search forwardly the event of easy fly and struck out by the losing team and then +2000 is added to the appropriate event. For the event of the "scene 5" the search extent is set from the occurrence time of the event of the "scene 4" to the present time to search backwardly the event of easy fly and struck out by the losing team and then +1000 is added to the appropriate event.

Furthermore, as shown in FIG. 32, in the event correlation pattern table in accordance with the embodiment, there are set items including a "scene number" corresponding to the scene of event selected based on the event extraction adjustment table, a "target team", a "correlation target event" indicative of the event name in association with the event selected as above, a "correlation extent" indicative of the search extent of the correlation target event, and an "importance adjustment point of the correlation target event" for adjusting the importance of the correlation target event.

For example, when the pattern 1 is selected by use of the scenario pattern determination table of the digest scenario information to select the event of the scene 1 by use of the event extraction table, if the correlation event in the event correlation pattern table of the pattern 1 corresponding thereto is searched, there are "hit and get a base", and "get a base, home-in". By searching these in the search extent indicated by the "correlation extent" and if "hit and get a base" is found then the event importance is added with +400, otherwise if "get a base and home in" is found then the event importance is added with +100.

Figure 30:
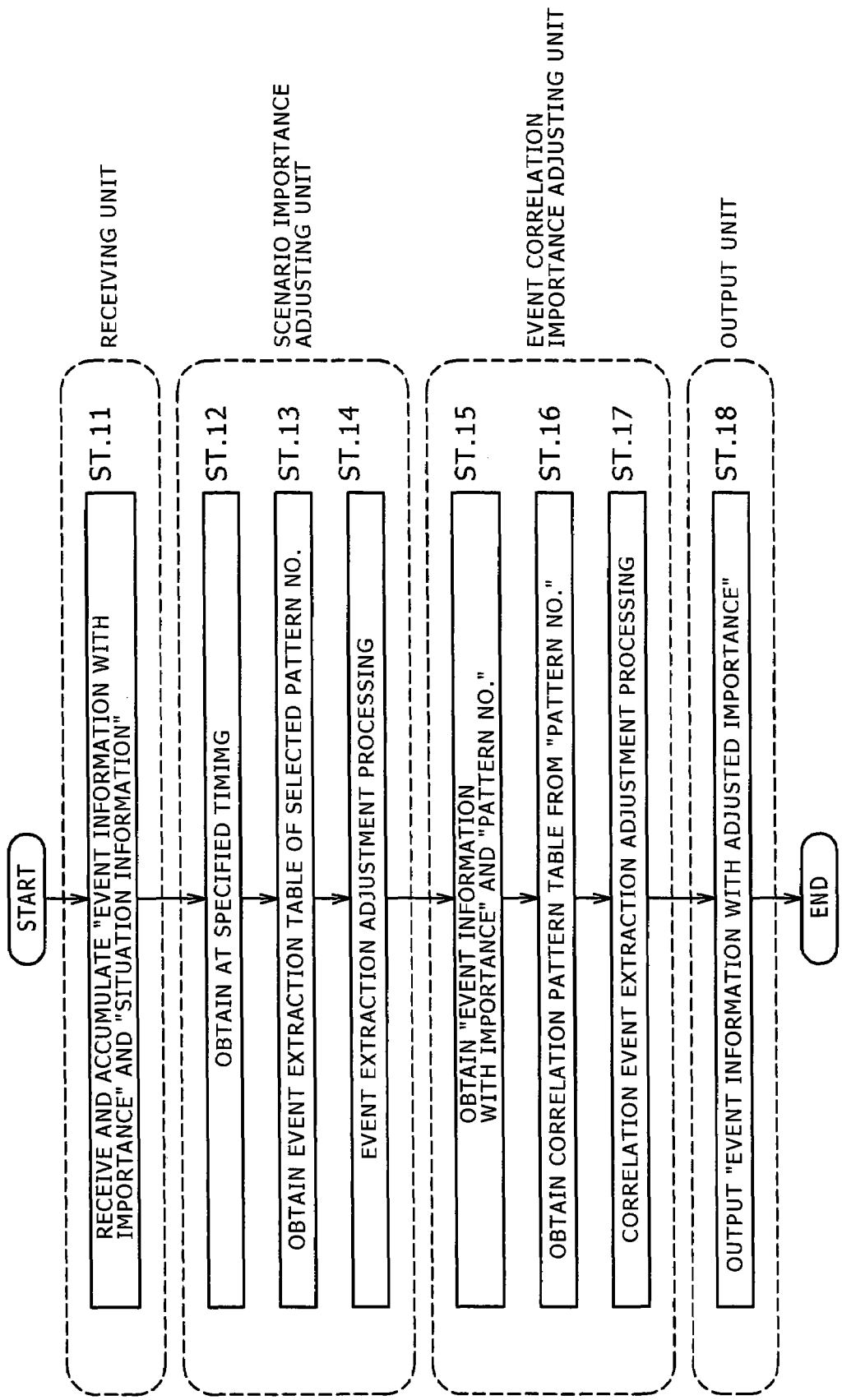
FIG. 30 shows a schematic flow diagram indicative of the processing procedure in the event importance adjustment device in accordance with the fourth embodiment of the present invention.

Now referring to FIG. 30, there is shown the processing procedure of the event importance adjustment device 10. The receiving unit 11 receives the event information with importance and the situation information and accumulates them into the event information with importance and situation information accumulator unit 12 (step 11). The scenario importance adjusting unit 14 obtains the accumulated event information with importance and the situation information at the specified timing (step 12), to input to the digest scenario information storing unit 13. The digest scenario information storing unit 13 in turn selects a pattern number from the "scenario pattern determination table" based on the information provided, obtains the "event extraction adjustment table" of the selected pattern number to input to the scenario importance adjusting unit 14 (step 13). The scenario importance adjusting unit 14 then selects an event (scenario event) to be adjusted based on the "event extraction adjustment table" and adjusts the importance of thus selected scenario event (step 14).

Figure 31:
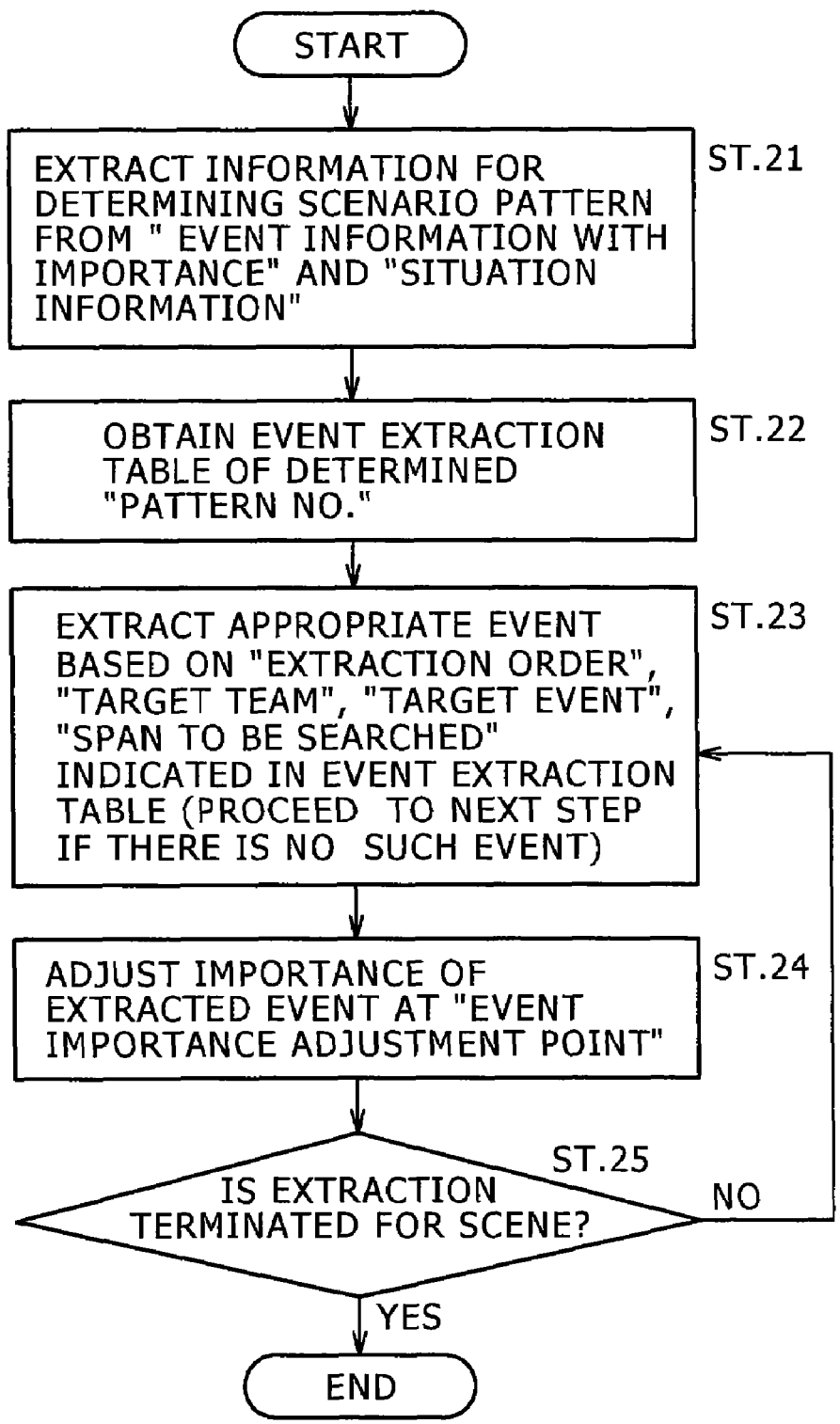
FIG. 31 shows a schematic flow diagram indicative of the procedure of the event extraction adjustment process in accordance with the fourth embodiment of the present invention.

Now referring to FIG. 31 the processing in the scenario importance adjusting unit 14 will be described in greater details. The scenario importance adjusting unit 14 extracts from the event information with importance and the situation information obtained, the information to which the "scenario pattern determination table" of the digest scenario information applies, such as the scoring situation, the scoring difference, the transition of the score difference, the number of times of turnabout, the number of times of scoring a tying run, and so on. From the situation information the scoring situation, the score difference and the transition of the score difference are extracted, and from the event information with importance the number of times of turnabout and tying are extracted (see FIG. 27 and FIG. 34). Based on the information extracted, the digest scenario information storing unit 13 determines the pattern number, obtains the "event extraction adjustment table" of that pattern number to input to the scenario importance adjusting unit 14 (step 22). Then, the appropriate event is extracted in accordance with the extraction order, target team, target event, and search extent indicated in the "event extraction adjustment table" (step 23). In the case where there is no such event, then the next event is searched. For example, in FIG. 29, when the event "scene 3" is searched and there is nothing about the easy fly or struck out of the losing team, then the event "scene 5" is searched. Thereafter, the value of the importance of the extracted event is adjusted in accordance with the event importance adjustment point indicated in the event extraction adjustment table (step 24), the event is provided with a scene number indicated in the event extraction adjustment table (see FIG. 35). By iteratively repeating (step 25) the process of extracting a scenario event (step 23) and adjusting the importance (step 24) in correspondence with the extraction order indicated in the "event extraction adjustment table", the points of the game may be grasped and the course of the game may be well presented.

The scenario importance adjusting unit 14 after having performed the processing described above, inputs the event information with importance (see FIG. 35) adjusted by use of the digest scenario information and the pattern number to the event relation importance adjusting unit 16 (step 15), the event relation importance adjusting unit 16 in turn inputs the pattern number to the event relation pattern table storing unit 15. In the event relation pattern table storing unit 15, the pattern number is examined to obtain the "event correlation pattern table" of the determined pattern number to input to the event relation importance adjusting unit 16 (step 16). The event relation importance adjusting unit 16 then selects the correlation event in association with the scenario event that is subject to adjust by the scenario importance adjusting unit 14, based on the "event correlation pattern table" to adjust the importance of the scenario event thus selected (step 17).

Figure 33:
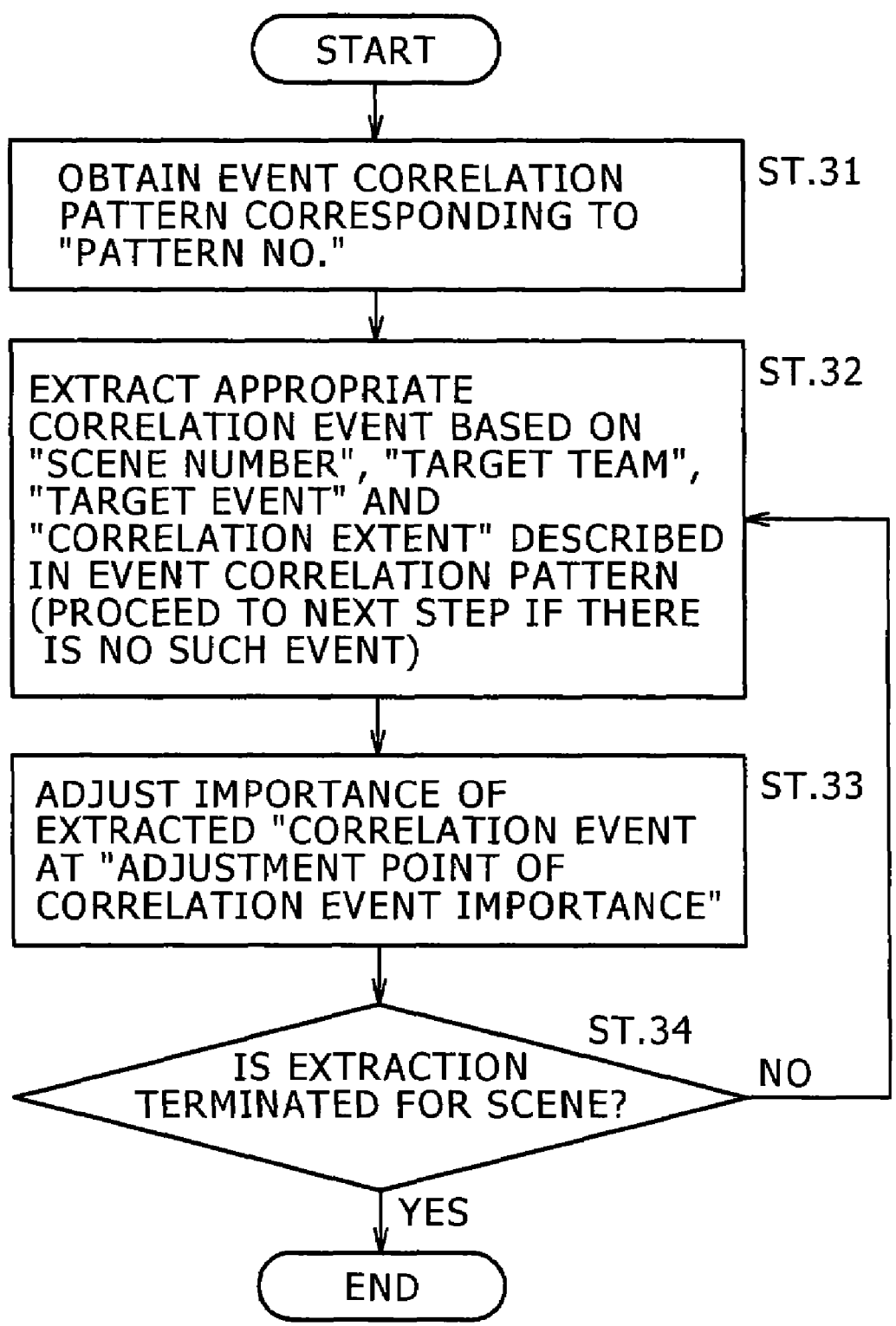
FIG. 33 shows a schematic flow diagram indicative of the procedure of correlation event extraction adjustment process in accordance with the fourth embodiment of the present invention.

The processing in the event relation importance adjusting unit 16 will be described in greater details with reference to FIG. 33. The event relation importance adjusting unit 16, by inputting the obtained pattern number to the event relation pattern table storing unit 15, obtains the "event correlation pattern table" of the appropriate pattern number (step 31). Next, it extracts the appropriate correlation event based on the scene number, target team, target event, and correlation extent, all indicated in the event correlation pattern table" (step 32). Then, in accordance with the event importance adjustment point indicated in the "event correlation pattern table", the value of the importance of the extracted event is adjusted (step 33), and the event is provided with a scene number indicated in the event correlation pattern table (see FIG. 36). By iteratively repeating (step 34) the process of extracting the correlation event (step 32) and adjusting the importance (step 33) in accordance with the extraction order indicated in the "event correlation pattern table", the importance adjustment may be allowed with both the important event for the game and the correlation event being included. By use of the event correlation pattern table, the importance of the event in association with the event adjusted by the scenario importance adjusting unit 14 is raised, so that the effect of setting the course of the game is also significantly increased. By not only adjusting the event importance of the scenario event itself but also adjusting the importance of the event(s) having some relation with the event in succession, different but important events can be extracted in accordance with the pattern of the course of the game, or more specifically, the important scenes for the game can be positively extracted.

The event relation importance adjusting unit 16 having performed the above processing inputs the event information with importance thus adjusted (see FIG. 36) to the output unit 17, and the output unit 17 in turn outputs it (step 18).

As can be appreciated from the foregoing description, the event importance adjustment device 10 uses the input event information with importance (see FIG. 34) and the situation information to first determine the pattern of the game (pattern 1), then uses the event extraction adjustment table of the pattern of the game to select the important events for the game. Then, the selected events are identified to be part of important scenes to be extracted, and the event correlation pattern table of the pattern of the game is used to select the correlation event in association with the identified event. By so doing, the importance adjustment is allowed to add both the course of the game and the event correlation in accordance with the pattern of the game being set based on the "presence or absence of the score difference of both teams" and the "transition thereof", and the important scenes may be positively extracted as shown in FIG. 37.

The event importance adjustment device in accordance with the present invention may be used in combination with a device for automatically creating a digest based on the video contents, for example an editing console for editing a digest video of a sports game in a broadcasting station, or a home-use device for creating a digest from the received sports telecast video stream may incorporate the device in accordance with the present invention, or may use it as the preprocessor.

The event importance adjustment device in accordance with the present invention may be applied to any genre of video contents not only limited to the sports video contents such as the base ball, football, tennis, golf, swimming, marathon and the like. For example, it can be applied to cinema, drama, or news. More specifically, a pattern is determined based on a predetermined information in a genre ("scoring point and the transition thereof" or "score difference and the transition thereof" if the genre is sports), events necessary for presenting the course of the video contents may be determined for each pattern, and a table indicative of the digest scenario information for setting the extraction condition required for extracting the events and the extraction order of the events may be managed so that any events presenting the course of the video contents which differ for each pattern may be extracted. Any one of events having a correlation with an important event in the video contents may be extracted by setting and managing the correlation pattern information of events.

In the embodiments described above, although the event information with importance and the situation information have been described to be inputted into the event importance adjustment device, the importance computing unit may be alternatively provided in the event importance adjustment device for computing the importance from the event information so as to allow providing the event information and situation information to the event importance adjustment device to generate the event information with importance from the event information within the event importance adjustment device.

What is claimed is:

1. An event importance adjustment device, comprising:
    a digest scenario information memory device that stores and manages digest scenario information indicative of:
        a) an event extraction condition,
        b) an extraction order,
        c) an event importance adjustment point, and
        d) a scenario pattern including a plurality of video sections within a course of video contents, the video sections determined based on the video contents,
    wherein a)-d) are specific to presentation of the course of the video contents;
    a scenario importance adjusting processor that:
    e) receives event information with importance containing events each indicative of a phenomenon in the video contents and the importance of the event as well as situation information indicative of a situation of the video contents,
    f) extracts an appropriate event based on the digest scenario information, the appropriate event being extracted from a video section based on the scenario pattern, and
    g) adjusts the importance of the event, the importance of the appropriate event being adjusted based on the video section from which the appropriate event was extracted,
    an event correlation pattern information storing unit that manages an event correlation pattern table indicative of a trigger event which triggers start of processing, a correlation event which is associated with the trigger event, and an importance adjustment point of the correlation event; and
    an event correlation importance adjusting unit that extracts an appropriate correlation event based on the event correlation pattern table if the event adjusted by the scenario importance adjusting unit is the trigger event, and adjusts the importance of the correlation event.

2. The event importance adjustment device according to claim 1,
    wherein the digest scenario information includes event extraction adjustment table that sets patterns based on presence or absence of a scoring point and the transition thereof and sets an extraction order and an extraction condition of events for each of the patterns.

3. The event importance adjustment device according to claim 1,
    wherein the digest scenario information includes an event extraction adjustment table that sets patterns based on presence or absence of a difference of scoring point and the transition thereof and sets an extraction order and an extraction condition of events for each of the patterns.

4. An event importance adjustment method comprising the steps of:
    receiving event information with importance containing events indicative of a phenomenon in video contents, the importance of the event, situation information indicative of a situation of the video contents, and a scenario pattern including a plurality of video sections within a course of video contents, the video sections determined based on the video contents;
    extracting by a processor an appropriate event based on digest scenario information stored in a memory, the appropriate event being extracted from a video section based on the scenario pattern, and adjusting the importance of the appropriate event based on the video section from which the appropriate event was extracted;

managing an event correlation pattern table indicative of a trigger event which triggers start of processing, a correlation event which is associated with the trigger event, and the importance adjustment point of the correlation event to extract an appropriate correlation event based on the event correlation pattern table if the adjusted event is the trigger event so as to adjust the importance of the correlation event.

5. A computer readable storage medium storing a program executed on a computer to perform the steps of:

receiving event information with importance containing events each indicative of a phenomenon in video contents, the importance of the event, situation information indicative of a situation of the video contents, and a scenario pattern including a plurality of video sections within a course of video contents, the video sections determined based on the video contents;

extracting an appropriate event based on digest scenario information, the appropriate event being extracted from a video section based on the scenario pattern, and adjusting the importance of the appropriate event based on the video section from which the appropriate event was extracted;

managing an event correlation pattern table indicative of a trigger event which triggers start of processing, a correlation event which is associated with the trigger event, and importance adjustment point of the correlation event to extract an appropriate correlation event based on the event correlation pattern table if the adjusted event is the trigger event so as to adjust importance of the correlation event.

* * * * *